(12) United States Patent
Yoshizawa

(10) Patent No.: US 6,222,804 B1
(45) Date of Patent: Apr. 24, 2001

(54) OPTICAL HEAD APPARATUS

(75) Inventor: Takashi Yoshizawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/166,288

(22) Filed: Oct. 5, 1998

(30) Foreign Application Priority Data

Oct. 6, 1997 (JP) .................................................. 9-272947
Oct. 17, 1997 (JP) .................................................. 9-285101

(51) Int. Cl.$^7$ ...................................................... G11B 7/09
(52) U.S. Cl. .................................... 369/44.41; 369/44.42; 369/44.29; 369/44.35
(58) Field of Search ............................ 369/44.37, 44.41, 369/44.42, 44.23, 44.29, 44.35, 112, 110

(56) References Cited

U.S. PATENT DOCUMENTS

| | | | | |
|---|---|---|---|---|
| 4,998,235 | * | 3/1991 | Ishibashi et al. | 369/44.41 |
| 5,172,355 | * | 12/1992 | Nagahara et al. | 369/44.41 |
| 5,537,374 | * | 7/1996 | Wachi | 369/44.34 |
| 5,982,722 | * | 11/1999 | Hashimoto | 369/44.29 |

* cited by examiner

Primary Examiner—Thang V. Tran
(74) Attorney, Agent, or Firm—Pillsbury Winthrop LLP

(57) ABSTRACT

This invention provides an optical head apparatus that is not influenced by the offset component contained in a track deviation signal and the track offset caused by lens shift control. According to an optical head apparatus of this invention, portions of light-receiving regions of a photodetector for detecting a track deviation signal are used as offset component detection light-receiving regions for removing any offset component from a track deviation signal. With this arrangement, the offset component contained in a track deviation signal, i.e., the influence of a lens shift on a tracking error signal, is removed by using light from the region where all the 0th-order diffracted light, 1st-order diffracted light, and −1st-order diffracted light of the light reflected by the optical disk overlap each other. In addition, a header signal can be accurately read by using outputs from the two outer detection regions of the photodetector, and the invention can also be applied to an optical disk based on the land/groove recording method. Since a track deviation signal is generated by using outputs from four detection regions obtained by dividing each of the two outer detection regions into two regions, superimposition of an offset component on the track deviation signal can be prevented, thereby realizing stable tracking control.

10 Claims, 20 Drawing Sheets

OPTICAL HEAD APPARATUS

BACKGROUND OF THE INVENTION

The present invention relates to a device in an optical head apparatus for recording information on an optical disk as a recording medium and reproducing information from the optical disk.

An optical disk apparatus includes an optical head apparatus having an objective lens for projecting a light beam whose cross-sectional beam diameter is set to a predetermined size onto the recording surface of an optical disk as a recording medium. The optical disk apparatus irradiates the light beam on the recording surface, and extracts reflected light corresponding to information recorded on the optical disk, thereby reproducing the information.

The above optical head apparatus is comprised of a semiconductor laser element (to be simply referred to as a laser element hereinafter) serving as a light source for emitting a light beam, an objective lens for focusing the light beam emitted from the laser element onto the recording surface of an optical disk as an information recording medium and extracting reflected light beam reflected by the recording surface, a photodetector for photoelectrically converting the reflected light beam extracted by the objective lens and outputting a reproduction signal corresponding to the information recorded on the optical disk, a plurality of optical members forming the optical paths of light beams, and the like.

Guide grooves called grooves are formed in the recording surface of an optical disk to make the focused beam spot of the light beam focused by the objective lens always follow a predetermined position in the radial direction.

Known tracking control is performed to move the objective lens in the radial direction of the optical disk so as to make the center of the focused beam spot focused by the objective lens always coincide with the center of such a groove.

In this case, the amount by which the objective lens is to be moved, i.e., the tracking control amount, is set on the basis of the tracking error signal obtained by using, for example, the known push-pull method. Note that the push-pull method is disclosed in, for example, FIG. 1.99 in Noboru Murayama, "Optical Disk Technology", Radio Technology, 1989, pp. 86–88.

Header fields in which ID portions for providing address information, SYNC portions for providing sync signals, and the like are formed as pre-pits on an optical disk, as disclosed in, for example, Masahiro Ojima et al., "Principles and Applications of Optical Storage", 1995 IEICE, pp. 140 and 141. These header fields are located at predetermined positions in grooves at predetermined intervals. Note that the header fields are generally formed as pit rows having various predetermined lengths without offset in a direction in which the grooves extend when viewed from the circumferential direction.

As demands have recently arisen for optical disks having higher recording densities, a method (land/groove recording method) of recording information between grooves, i.e., on lands, as well as in grooves has been proposed. This method is disclosed in more detail in, for example, Sadatoshi Hujiwara et al., "Next-Generation Optical Disk Technology", Trikeps, 1995, pp. 59–74.

As a header field arrangement method in the land/groove recording method, a method of forming a total of four header fields shifted to the inner and outer peripheral sides, in pairs, by ¼ the groove pitch has been proposed in, for example, PROCEEDINGS OF THE 1995 IEICE GENERAL CONFERENCE, Section C-287. According to this proposal, the track position and the like are detected from all the information recorded on the four header fields.

In the above land/groove recording method, data are recorded (recorded data are present) on lands and grooves. In other words, a focused beam spot must trace lands and grooves.

In this case, whether a focused beam spot is tracing a land or a groove must be discriminated on the basis of the information recorded on the header fields. As is known, the output from a photodetector having division lines formed along the circumferential direction of the optical disk is extracted as a difference signal based on the received light pattern, thereby detecting the position of the focused beam spot. More specifically, every time the focused beam spot passes through a pit of a header field, a reproduction signal waveform having a given amplitude is output, including, for example, a positive displacement component when the header field is shifted to the inner peripheral side of the groove, or a negative displacement component when the header field is shifted to the outer peripheral side of the groove. By specifying the polarity of this displacement component, therefore, a land or a groove is identified.

If it is necessary to read information from a position (groove or land) different from the current track (groove or land) on the optical disk or record new information in another track, the focused beam spot must be moved from the track on which the focused beam spot is currently located to a predetermined target track.

In many cases, this movement is controlled by appropriately combining two operations, i.e., driving an actuator in the radial direction by using a linear motor and displacing the objective lens on the actuator in the tracking direction (to be referred to as a lens shift hereinafter).

To realize high-speed information read or write, it is desirable to make a focused beam spot follow the track center as quickly as possible when the focused beam spot reaches a desired track. To realize this, the following method is generally used. First of all, the overall actuator is coarsely brought close to the target track, e.g., 5 to 10 tracks before the target track, by the linear motor. For movement corresponding to the several remaining tracks, tracking is controlled by a lens shift. As the focused beam spot approaches the target track, or after the focused beam spot reaches it, the linear motor is finely driven to reduce the lens shift amount.

In this method, however, when the above lens shift is performed to make the objective lens trace the target track, an offset component is superimposed on a phase difference signal. As a result, a track offset occurs; the track center is determined even if the center of the focused beam spot deviates from the center of the target track. This makes tracking control unstable.

In addition, in detecting a track deviation signal by the push-pull method, in spite of the fact that the track center coincides with the center of the focused beam spot, an unwanted track deviation signal (false track deviation signal) indicating the occurrence of a track deviation is output. This also makes tracking control unstable. If the false track deviation signal and the track offset have the same polarity, a tracking error may be caused by tracking control.

In contrast to this, in the land/groove recording method, since the signal from each header field includes a component that can be identified as either a displacement component, i.e., the above track offset, or the false track deviation signal, the true displacement component must be accurately separated. That is, in land/groove recording, if the true displacement component is not separated, a reproduction signal from a given header field on the inner or outer peripheral side is buried in the above track offset or false track deviation signal. This causes a decrease in reproduction precision of the information recorded on the header field, or a read error or failure in the worst case.

BRIEF SUMMARY OF THE INVENTION

It is an object of the present invention to provide an optical head apparatus which is not influenced by the offset component contained in a tracking error signal and the track offset caused by lens shift control.

According to the present invention, there is provided an optical head apparatus comprising:

a light source for emitting a light beam having a predetermined wavelength;

an objective lens for focusing the light beam emitted from the light source to provide a minimum beam spot at a predetermined position on a recording surface of a recording medium at a predetermined depth, and condensing (capturing) a reflected light beam reflected by the recording surface of the recording medium;

a photodetector including at least three light-receiving regions defined by first and second division lines extending in a direction perpendicular to a direction in which a beam spot of the reflected light beam moves as the beam spot of the light beam focused on the recording surface by the objective lens moves in a radial direction of the recording medium, and serving to output a current corresponding to an intensity of the reflected light beam, the first light-receiving region of the photodetector having a size that covers a region where a central beam spot reflected by the recording surface of the recording medium and having a highest intensity and two peripheral beam spots generated by diffraction on the recording surface at predetermined intervals with respect to the central beam spot in the direction in which the beam spot of the reflected light beam moves overlap each other, and serving to remove an unwanted signal component, the second light-receiving region of the photodetector having a size that covers a region obtained by removing the first light-receiving region from a region where the central beam spot and one of the peripheral beam spots overlap each other, and serving to generate a first header auxiliary signal, and the third light-receiving region of the photodetector having a size that covers a region obtained by removing the first light-receiving region from a region whether the central beam spot and the other of the peripheral beam spots overlap each other, and serving to generate a second header auxiliary signal.

In addition, according to the present invention, there is provided an optical head apparatus comprising:

a light source for emitting a light beam;

a polarization beam splitter for guiding the light beam emitted from the light source to a recording medium;

an objective lens for focusing the light beam passing through the polarization beam splitter onto a recording surface of the recording medium while giving the light beam predetermined imaging characteristics;

a tracking control coil for generating thrust for moving the objective lens in a direction perpendicular to a guide groove unique to the recording medium;

a non-polarization beam splitter serving as a half mirror for splitting a light beam split from the light beam focused on the recording surface of the recording medium by the objective lens, reflected by the recording surface, passing through the objective lens, reflected by the polarization beam splitter, and traveling toward the objective lens into two light beams having substantially the same intensity;

a photodetector having first and second light-receiving regions defined by a division line extending along a direction in which a shadow of the guide groove unique to the recording medium or a pit array and first and second linear light-receiving regions defined in the first and second light-receiving region by linear outline division lines defined symmetrically with respect to the division line as an axis of symmetry, serving to receive light beams split by the non-polarization beam splitter through the first and second light-receiving regions, photoelectrically convert the light beams, and generate a tracking error signal indicating the amount of deviation between a center of the guide groove unique to the recording medium and a center of the light beam focused by the objective lens, and serving to receive, through the first and second linear light-receiving regions, a light beam irradiated-on a region where 0th-order diffracted light, 1st-order diffracted light, and −1st-order diffracted light of the light beam reflected by the recording surface of the recording medium overlap each other, photoelectrically convert the received light beam, and generate a signal corresponding to an offset component in the tracking error signal indicating the amount of deviation between the center of the guide groove unique to the recording medium and the center of the light beam focused by the objective lens;

a track deviation/offset detection circuit for obtaining an actual amount of deviation between the center of the guide groove unique to the recording medium and the center of the light beam focused by the objective lens by subtracting a difference signal between output signals output from the first and second linear light-receiving regions from a difference signal between two signals obtained by adding predetermined combinations of outputs from the first and second light-receiving regions of the photodetector and outputs from the first and second linear light-receiving regions; and a tracking control circuit for supplying a current to the tracking control coil in a predetermined direction on the basis of a track deviation signal obtained by the track deviation/offset detection circuit.

Furthermore, according to the present invention, there is provided an optical head apparatus comprising:

a light source for emitting a light beam;

a polarization beam splitter for guiding the light beam emitted from the light source to a recording medium;

an objective lens for focusing the light beam passing through the polarization beam splitter onto a recording surface of the recording medium while giving the light beam predetermined imaging characteristics;

a tracking control coil for generating thrust for moving the objective lens in a direction perpendicular to a guide groove unique to the recording medium;

a non-polarization beam splitter serving as a half mirror for splitting a light beam split from the light beam focused on the recording surface of the recording medium by the objective lens, reflected by the recording surface, passing through the objective lens, reflected by the polarization beam splitter, and traveling toward the objective lens into two light beams having substantially the same intensity;

a photodetector having a total of five light-receiving regions including first and second light-receiving regions defined by first and second division lines extending in a direction in which a shadow of the guide groove unique to the recording medium is projected or a pit array, a middle light-receiving region sandwiched between the first and second light-receiving regions, and light-receiving regions obtained by dividing the first and second light-receiving regions by using fourth and fifth division lines perpendicular to the first and second division lines, and capable of receiving and photoelectrically converting light beams split by the non-polarization beam splitter through the first and second light-receiving regions and outputting a difference between a sum of an output from one of the light-receiving regions of the second light-receiving region, defined by the fourth division line, and an output from one of the light-receiving regions of the third light-receiving region, defined by the fifth division line, which region is at a rotation-symmetrical (diagonal) position with respect to the one of the light-receiving regions of the second light-receiving region, and a sum of an output from the other of the light-receiving regions of the second light-receiving region, defined by the fourth division line, and an output from the other of the light-receiving regions of the third light-receiving region, defined by the fifth division line, which region is at a rotation-symmetrical (diagonal) position with respect to the other of the light-receiving regions of the second light-receiving region;

a track deviation detection circuit for obtaining a tracking error signal indicating an amount of deviation between the center of the guide groove unique to the recording medium and the center of the light beam converged by the objective lens on the basis of the different between the two (diagonal) outputs which is output from the photodetector; and a tracking control circuit for supplying a current to the tracking control coil in a predetermined direction on the basis of a track deviation signal obtained by the track deviation detection circuit.

Additional objects and advantages of the invention will be set forth in the description which follows, and in part will be obvious from the description,.or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will be described in detail below with reference to the views of the accompanying drawing.

Figure 1:
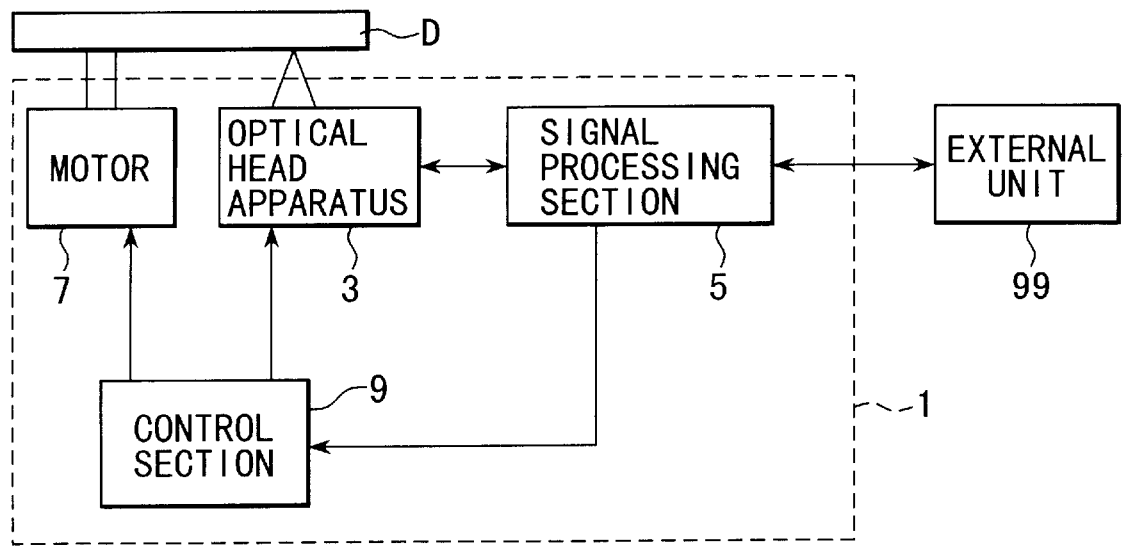
FIG. 1 is a schematic view showing an optical disk apparatus having an optical head apparatus according to an embodiment of the present invention.
Figure 2:
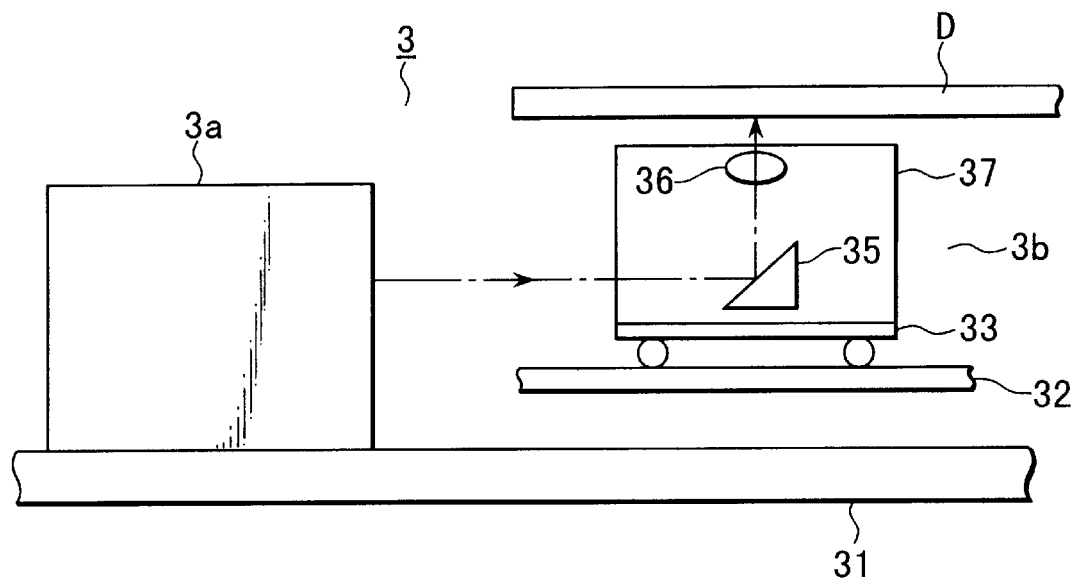
FIG. 2 is a schematic block diagram showing the arrangement of the optical head apparatus incorporated in the optical disk apparatus in FIG. 1.
Figure 3:
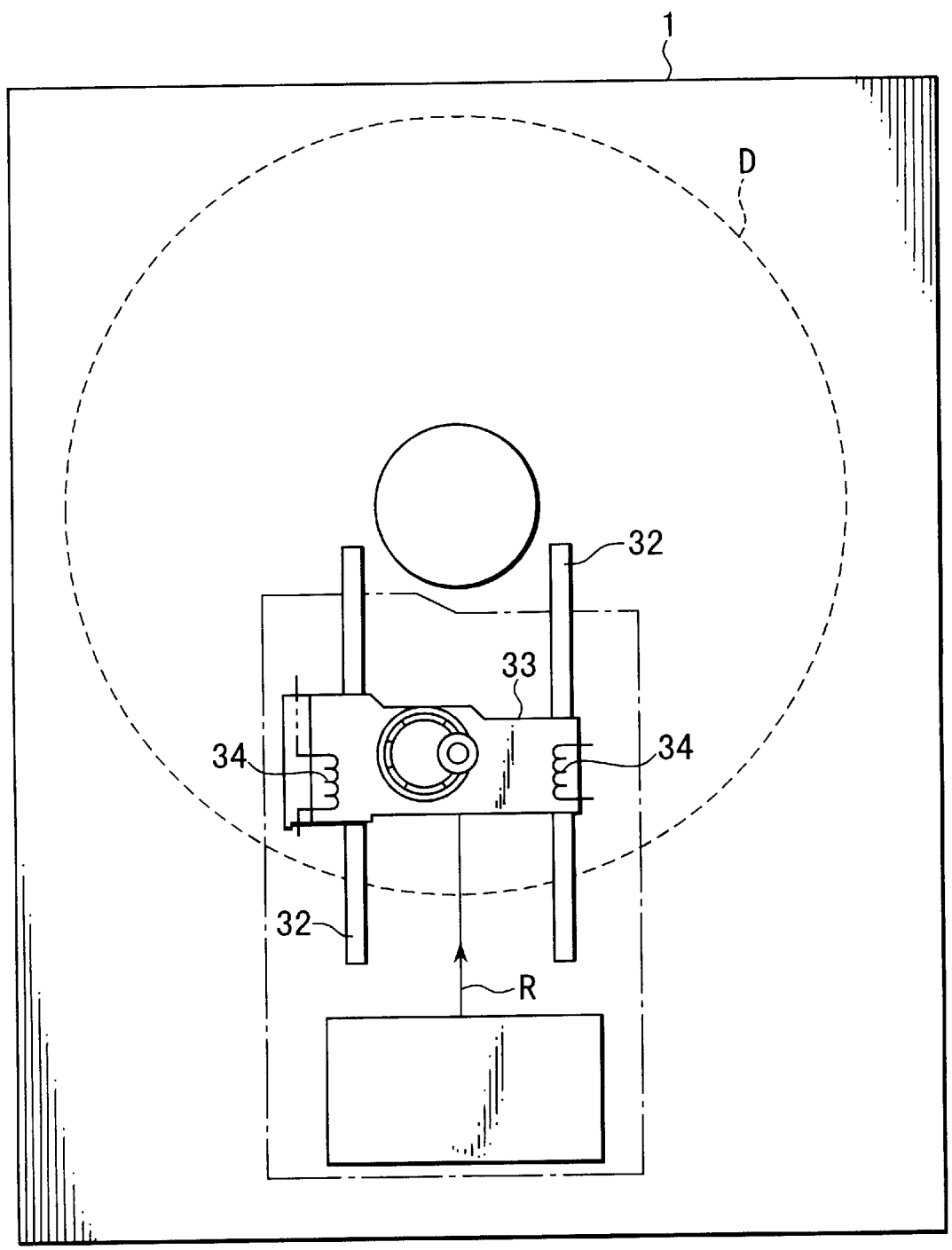
FIG. 3 is a schematic view showing an example of the actuator of the optical head apparatus in FIG. 2.
Figure 4:
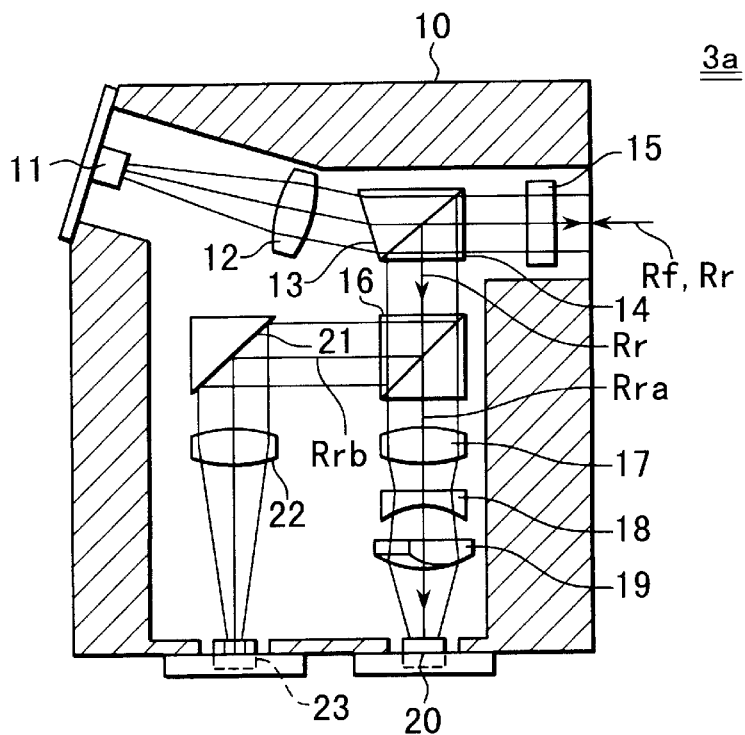
FIG. 4 is a schematic view showing an example of the stationary optical system of the optical head apparatus in FIG. 2.
Figure 5:
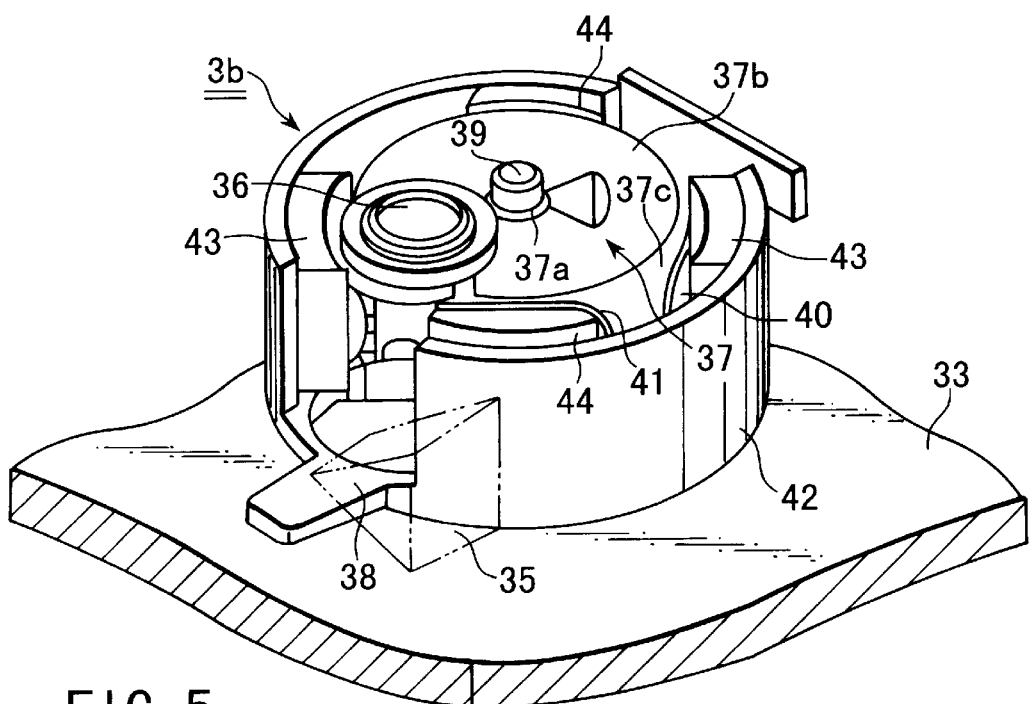
FIG. 5 is a schematic view for explaining the lens holder of the actuator in FIG. 3 and its vicinity.

FIG. 1 is a block diagram for briefly explaining an optical disk apparatus in which an optical head apparatus according to an embodiment of the present invention is to be incorporated.

Referring to FIG. 1, while the positions of an optical disk D on which laser beams are irradiated are controlled by control signals from a control section 9, an optical head apparatus 3 exchanges the laser beams with the optical disk D upon exchanging electrical signals with a signal processing section 5.

The signal processing section 5 converts information read from the optical disk D by the optical head apparatus 3 into an electrical signal in accordance with an instruction from an external unit 99, and reproduces it as recorded information. The signal processing section 5 also generates a recording signal for making information recorded on the optical disk D correspond to a change in the intensity of the laser beam emitted from the optical head apparatus 3.

The control section 9 controls the intensity of the laser beam to be irradiated from the optical head apparatus 3 onto the optical disk D, the position of the laser beam on the optical disk D, the rotational speed of the optical disk D rotated by a motor 7, and the like.

The flows of laser beams in the above optical head apparatus 3 will be described next with reference to FIGS. 2 to 5.

A laser beam Rf emitted from a laser element 11 is collimated by a collimator lens 12. The cross-sectional shape of the collimated beam is corrected into a substantially circular shape by an elliptical correction prism 13. The laser beam passes through the prism 13 is transmitted through a beam splitter 14.

The laser beam Rf transmitted through the beam splitter 14 passes through a quarter-wave plate 15. As a result, the polarization of the laser beam is converted from linear polarization into circular polarization. The resultant laser beam then emerges toward a reflection mirror 35 of an actuator 3b.

The laser beam Rf guided to the reflection mirror 35 is bent nearly 90° to be guided to an objective lens 36 held on a lens holder 37.

Note that the objective lens 36 is held by the lens holder (to be described below with reference to FIG. 5) to be movable in the tracking direction that is parallel to the recording surface of the optical disk D (to be described in detail later with reference to FIG. 6) and substantially perpendicular to a guide groove, i.e., a groove g, formed in the recording surface of the optical disk D in advance, and in the focusing direction perpendicular to the recording surface of the optical disk D.

The objective lens 36 has an aperture ratio of about 0.6 for the wavelength (650 nm) of the laser beam emitted from the laser element 11. The objective lens 36 also has a focal length Fo of 3.3 mm and an effective diameter of about 4 mm and provides a focused beam spot diameter of about 0.001 mm on the recording surface of the optical disk D. The dimensions of a record mark, i.e., a pit, formed in the optical disk D are set as follows: pit width (in a direction perpendicular to the groove)=0.4 to 0.44 $\mu$m; pit length (in a direction parallel to the groove)=0.63 $\mu$m or 0.84 $\mu$m; and pit depth=about 0.07 $\mu$m. The intervals between pits in the groove direction are about 0.74 $\mu$m. Assume that a 0.6-mm thick substrate is used as the optical disk D. Note that the wavelength of the laser beam that can be used is 635 to 685 nm.

After the laser beam Rf is guided to the objective lens 36 and focused, the light is irradiated as a spot onto the optical disk D.

A reflected laser beam Rr obtained when the laser beam Rf irradiated on the optical disk D is reflected by the guide groove, i.e., the groove g, in the recording surface of the optical disk D is sequentially returned to the objective lens 36 and the reflection mirror 35. The polarization of this laser beam is converted again from circular polarization into linear polarization by the quarter-wave plate 15. The resultant laser beam enters the beam splitter 14. Since the polarizing direction of the reflected laser beam Rr is rotated 90° with respect to the polarizing direction of the laser beam Rf emitted from the laser element 11, the laser beam Rf is reflected by the polarizing surface of the beam splitter 14.

The laser beam Rf that is split from the laser beam Rf emitted from the laser element 11 to the objective lens 36 by the beam splitter 14 is split into two reflected laser beams Rra and Rrb having substantially the same intensity by a beam splitter 16.

The reflected laser beam Rra transmitted through the beam splitter 16 passes through a convergent lens 17 to have predetermined imaging characteristics and predetermined convergence. The aberrations of this laser beam are corrected by a concave lens 18. A cylindrical lens 19 gives the laser beam astigmatism. The resultant laser beam is irradiated on a photodetector 20.

The reflected laser beam Rra irradiated on the photodetector 20 is converted into an electrical signal corresponding to the light intensity by the photodetector 20. This signal is used for a focus error signal and a reproduction signal. Since a focus error signal is detected by the known astigmatism method, a detailed description thereof will be omitted.

Focus control, i.e., focusing, is performed on the basis of the focus error signal generated by the photodetector 20 to eliminate any focal point deviation of the spot focused by the objective lens 36 with respect to the optical axis direction of the recording surface of the optical disk D. In focusing, a current is supplied to coils 40 in a predetermined direction on the basis of a focus error signal to generate attracting or repelling force based on the interaction between the magnetic field provided by magnets 43 and the electric field. As a result, the lens holder 37 (objective lens 36) is moved toward or apart from the recording surface of the optical disk D.

The optical path of the remaining reflected laser beam Rrb reflected by the beam splitter 16 is bent 90° by a mirror 21 and provided with predetermined convergence by a convergent lens 22. The resultant laser beam arrives at a photodetector 23 used to detect the track deviation and offset amount. As will be described later with reference to FIG. 7, the photodetector 23 has two light-receiving regions 23a and 23b defined by a division line 23c, and two strip-like light-receiving regions 24a and 24b that are defined by linear division lines 23d and 23e and are symmetrical about the division line 23c. The division lines 23d and 23e defined on the opposite sides of the division line 23c of the strip-like regions 24a and 24b are formed such that part or all of the reflected laser beam in the region where all the 0th-order diffracted light, 1st-order diffracted light, and −1st-order diffracted light of the reflected laser beam Rr overlap can be photoelectrically converted. The division line 23c is set to be substantially parallel to the direction in which the shadow of the groove g of the optical disk D is projected.

The respective signals photoelectrically. converted by the two light-receiving regions 23a and 23b of the photodetector 23 are used to generate a track deviation signal by using the known push-pull method, as will be described in detail later with reference to FIG. 8. Similarly, the respective signals photoelectrically converted by the two other strip-like regions 24a and 24b are used to generate a signal indicating the amount of offset component contained in the track deviation signal by using the known push-pull method.

Figure 8:
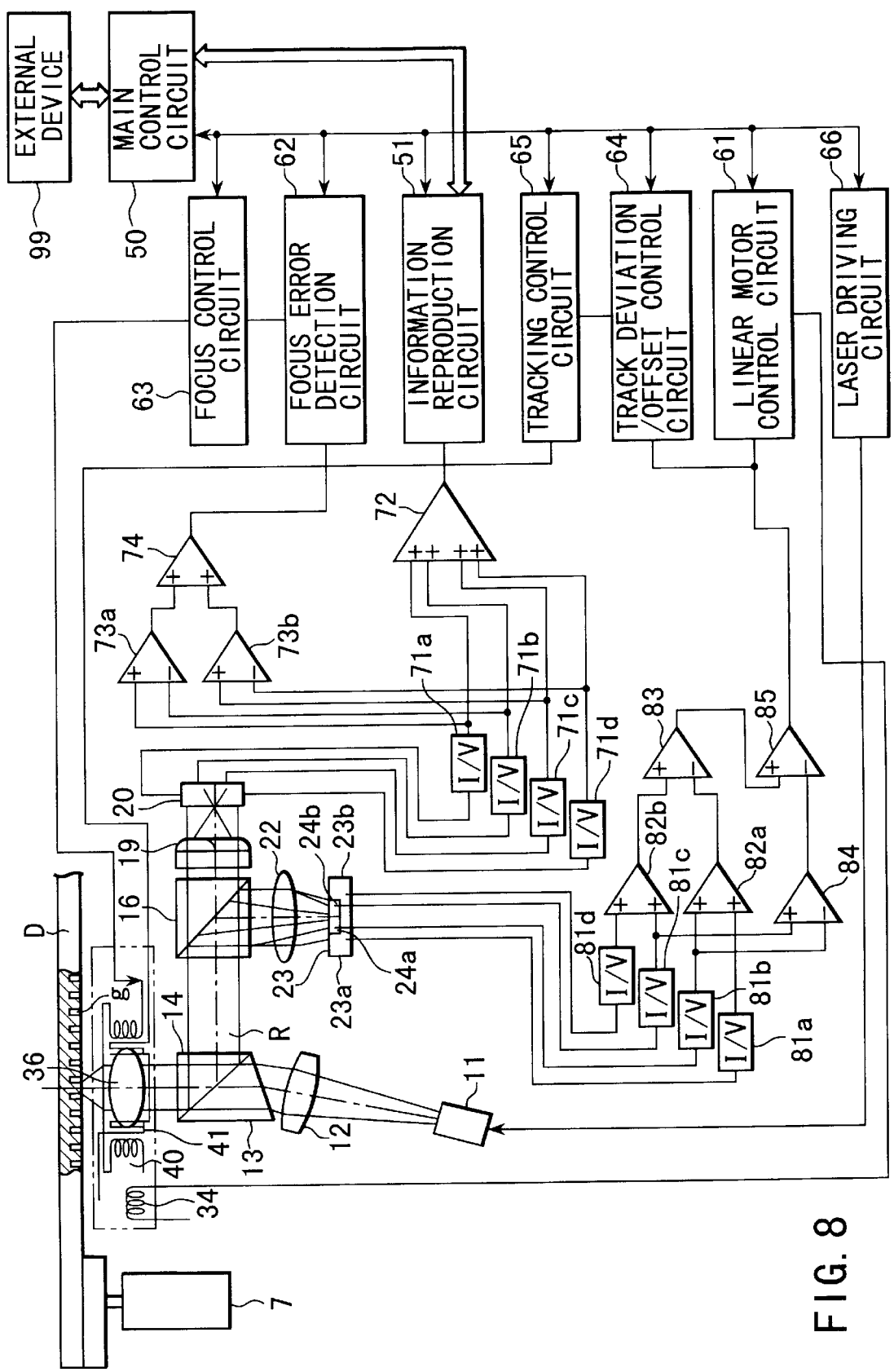
FIG. 8 is a schematic block diagram showing a signal processing section and a control section that can be used as the signal processing section and control section of the optical disk apparatus in FIG. 1.

A tracking error signal is generated by the signal processing section shown in FIG. 8 on the basis of the track deviation signal and the offset signal generated by the photodetector 23. Tracking control, i.e., tracking, is then performed to eliminate any focal point deviation of the spot converged by the objective lens 36 with respect to the center of the groove g in the recording surface of the optical disk D. In tracking, a current is supplied to coils 41 in a predetermined direction on the basis of the track deviation signal indicating the difference between the outputs from the light-receiving regions 23a and 23b of the photodetector 23 so as to generate attracting or repelling force based on the interaction between the magnetic field provided by magnets 44 and the electric field. As a result, the lens holder 37 (objective lens 36) is moved along the recording surface of the optical disk D toward the center of the optical disk D in its radial direction perpendicular to the groove g or toward the outer periphery. In addition, the magnitude of the current supplied to the coils 41 is corrected on the basis of the offset signal representing the difference between the outputs from the two regions 24a and 24b.

A high-density digital recording optical disk (DVD) which is higher in recording density than a conventional music optical disk (CD) and on which video information is also recorded has been put into practice. In addition, as a DVD-RAM (having grooves g; the intervals between the grooves are about 1.48 $\mu$m capable of recording/reproducing information at the same recording density as that of the DVD is proceeding toward practical utilization, the intervals between the adjacent grooves q shorten. Since the occurrence of an offset increases the crosstalk between the adjacent grooves g, the offset component contained in a track deviation signal must be reliably removed. Since the two regions 24a and 24b near the middle portion of the photodetector 23 correspond to the high-intensity portion of the 0th-order diffracted light component, they can be effectively used to correct the offset component contained in the track deviation signal.

More specifically, the outer peripheral portion of the 0th-order diffracted light of the reflected laser beam Rrb applied to the photodetector 23 is eclipsed by the objective lens 36, but both the 1st-order diffracted light and the −1st-order diffracted light overlap the 0th-order diffracted light. In addition, these light components overlap each other. As described above, the 0th-order diffracted light in the region where the 0th-order diffracted light, the 1st-order diffracted light, and −1st-order diffracted light overlap each other is substantially a laser beam corresponding to the center of the reflected laser beam Rr, and hence has a sufficient intensity. For this reason, variations in intensity of a center of the 0th-order diffracted light is designated, since, in both the region where the 0th-order diffracted light and the 1st-order diffracted light overlap and/or the region where the 0th-order diffracted light and the −1st-order diffracted light overlap, when the lens shift is occurrence.

Although the light-receiving areas of the regions 24a and 24b near the middle portion of the photodetector 23 are smaller than those of the light-receiving regions 23a and 23b, the photoelectrically converted signals obtained from at least one of the regions 24a and 24b is steep increased (or decreased), when the reflected laser beam Rrb passing through the center of the objective lens 36 slightly deviates from the center of the groove g. More specifically, a subtract signal of the both of output from the region 24a and the region 24b is designated a signal which denotes an offset of the lens 36. In this case, the widths of the light-receiving regions 24a and 24b, i.e., the distances from the division lines, which define the areas of the light-receiving regions 24a and 24b can be easily obtained from the specifications of the optical disk D, the wavelength of the laser beam Rf emitted from the laser element 11, the aperture ratio and imaging characteristics of the objective lens 36, the optical specifications of a stationary optical system 3a, and the like. If, for example, the distances (intervals) between the centers of the grooves g formed in the recording surface of the optical disk D are about 1.48 $\mu$m, this width is set to about ⅓ the beam spot diameter of the reflected laser beam (0th-order diffracted light component) reflected by the optical disk D. Note that when information is to be recorded on the recording surface of the optical disk D, this setting allows the information to be recorded both on the portions between the grooves g and on the centers of the grooves g.

The offset signal obtained in this manner is subtracted from the track deviation signal output from the light-receiving regions 23a and 24a and 23b and 24b of the photodetector 23 to generate a correction track deviation signal, i.e., a tracking error signal, thereby correcting the position of the objective lens 36. With this operation, appropriate tracking control can be performed.

As a result, a center of laser beam taken from the objective lens 36 can be accurately controlled to trace the center of the groove q of the optical disk D.

As shown in FIG. 8, an information reproduction circuit 51 receives a sum output from an adder 72 for obtaining the sum total of the voltage signals respectively output from first to fourth current-voltage converters 71a to 71d that are respectively connected to the four light-receiving regions (not shown) of the photodetector 20 to convert output currents from the respective light-receiving regions into voltages.

A focus error detection circuit 62 receives an output from an adder 74, which is obtained by adding outputs from first and second differential amplifiers 73a and 73b each serving to obtain differential outputs between two predetermined outputs of the output voltages output from the first to fourth current-voltage converters 71a to 71d.

A track deviation/offset detection circuit 64 and a linear motor control circuit 61 receive the synthetic signal obtained by processing predetermined combinations of the signals obtained by fifth to eighth current-voltage converters 81a to 81d by converting the currents respectively output from the light-receiving regions 23a, 24a, 23b, and 24b of the photodetector 23. For example, the following combinations of signals are processed. As shown in FIG. 8, an adder 82a adds an output from the light-receiving region 23a of the photodetector 23, i.e., an output from the fifth current-voltage converter 81a, to an output from the strip-like region 24a, i.e., an output from the sixth current-voltage converter 81b. An adder 82b adds an output from the light-receiving region 23b, i.e., an output from the seventh current-voltage converter 81c, to an output from the strip-like region 24b, i.e., an output from the eighth current-voltage converter 81d. A differential amplifier 83 subtracts the output from the adder 82a from that from the adder 82b, thereby generating a first difference signal. A differential amplifier 84 obtains the difference between the outputs from the two strip-like regions 24a and 24b, i.e., the difference between the outputs from the sixth and seventh current-voltage converters 81b and 81c. A differential amplifier 85 obtains the difference between the first difference signal generated by the differential amplifier 83 and the output from the differential amplifier 84, thereby generating a second difference signal. The second difference signal is input to the circuits 61 and 64.

As described above, according to the optical head apparatus 3 shown in FIGS. 2 to 8, the track deviation of the objective lens 36 is expressed by the second difference signal obtained by the differential amplifier 85 by subtracting the difference between the outputs from the two strip-like regions 24a and 24b obtained by the differential amplifier 84, from the first difference signal obtained by subtracting the sum of the outputs from the light-receiving region 23b and the strip-like region 24b of the photodetector 23, obtained by the adder 82b, from the sum of the outputs from the light-receiving region 23a and the strip-like region 24a of the photodetector 23, obtained by the adder 82a.

As described previously, the above embodiment can also be applied to an optical disk for a DVD-RAM. Therefore, letting L1 be the output level outputted from the amplifier 82a and letting L2 be the output level outputted from the amplifier 82b, (L1−L2)pp of (L1−L2) be the maximum value and (L1+L2)a be the sum signal of the first and second signals L1 and L2 with respect to the light beam reflected by that region, of the recording surface of the optical disk D, on which no information is recorded and in which no groove q is formed, 0.35≦[(L1−L2)pp/(L1+L2)a]≦1.05.

That is, the track deviation/offset detection circuit 64 calculates the track deviation amount obtained by the differential amplifier 83 and the offset amount detected by the differential amplifier 84, and this calculation compensates for the offset amount originating from the lens shift of the objective lens 36 and behaving like a tracking error, i.e., the offset component contained in a track deviation signal.

Letting [(L1−L2)/(L1+L2)]pp be the maximum value of the amplitudes obtained by dividing the instantaneous values of signal level (L1−L2) by the instantaneous values of signal level (L1+L2), 1.10≦[(L1−L2)/(L1+L2)]pp≦1.65.

In addition, letting [(L1−L2)/(L1+L2)]ppmax be the maximum value of [(L1−L2)/(L1+L2)]pp, and [(L1−L2)/(L1+L2)]ppmin be the minimum value of [(L1−L2)/(L1+L2)]pp, [(L1−L2)/(L1+L2)]ppmin/[(L1−L2)/(L1+L2)]ppmax≧0.70.

Figure 9:
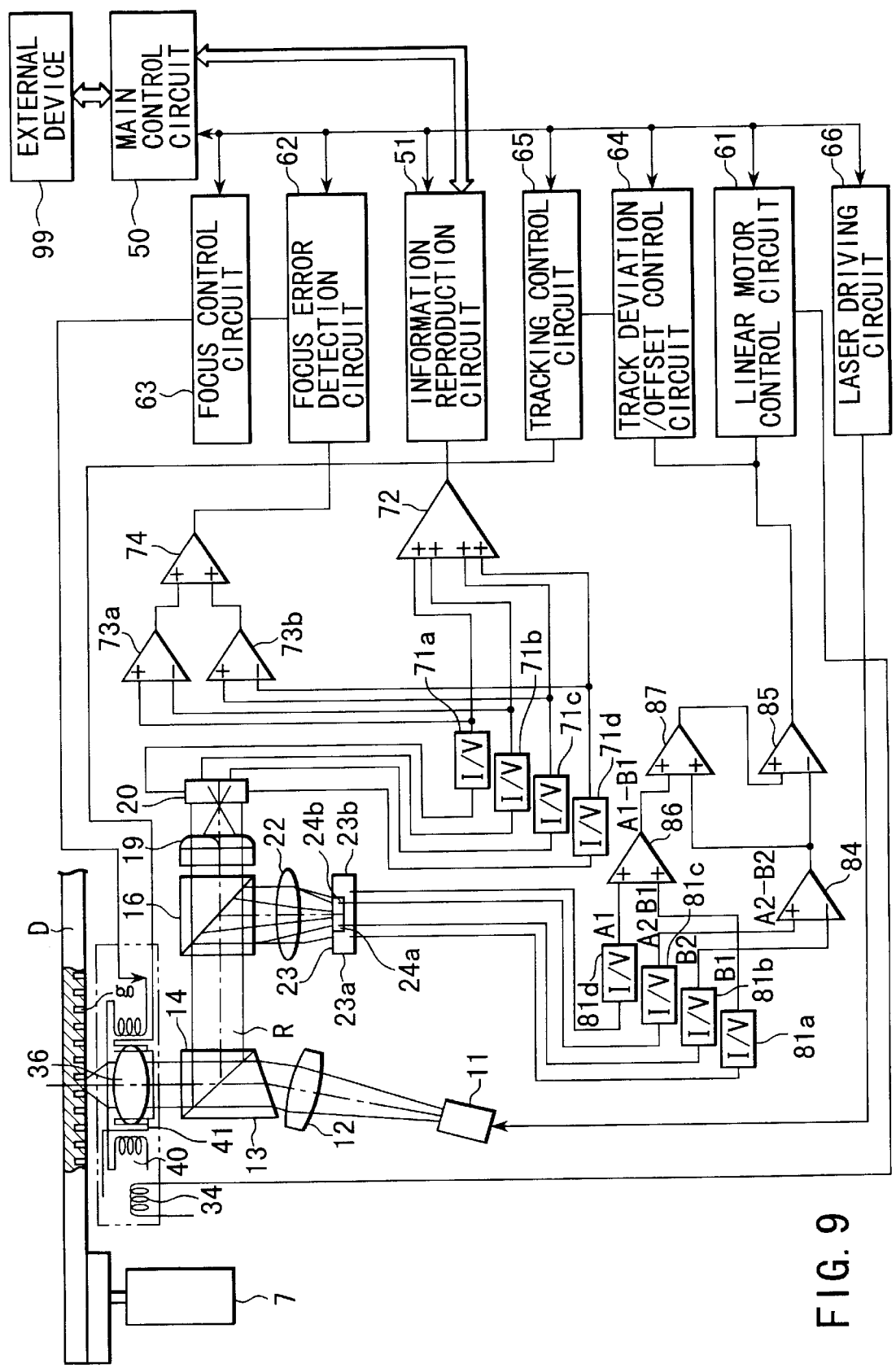
FIG. 9 is a schematic block diagram showing modifications of the signal processing section and the control section in FIG. 8.

The crosstalk in high-density optical disks typified by optical disks for DVD-RAMs can therefore be greatly reduced. For example, outputs from the above adders and differential amplifiers may be combined in the manner shown in FIG. 9. In this case, a differential amplifier 86 adds outputs from the fifth and eighth current-voltage converters 81a and 81d, and an adder 87 adds the resultant output signal to the output signal obtained by the differential amplifier 84. The differential amplifier 85 then subtracts the output from the differential amplifier 84 from the signal obtained by the adder 87 again.

Figure 10:
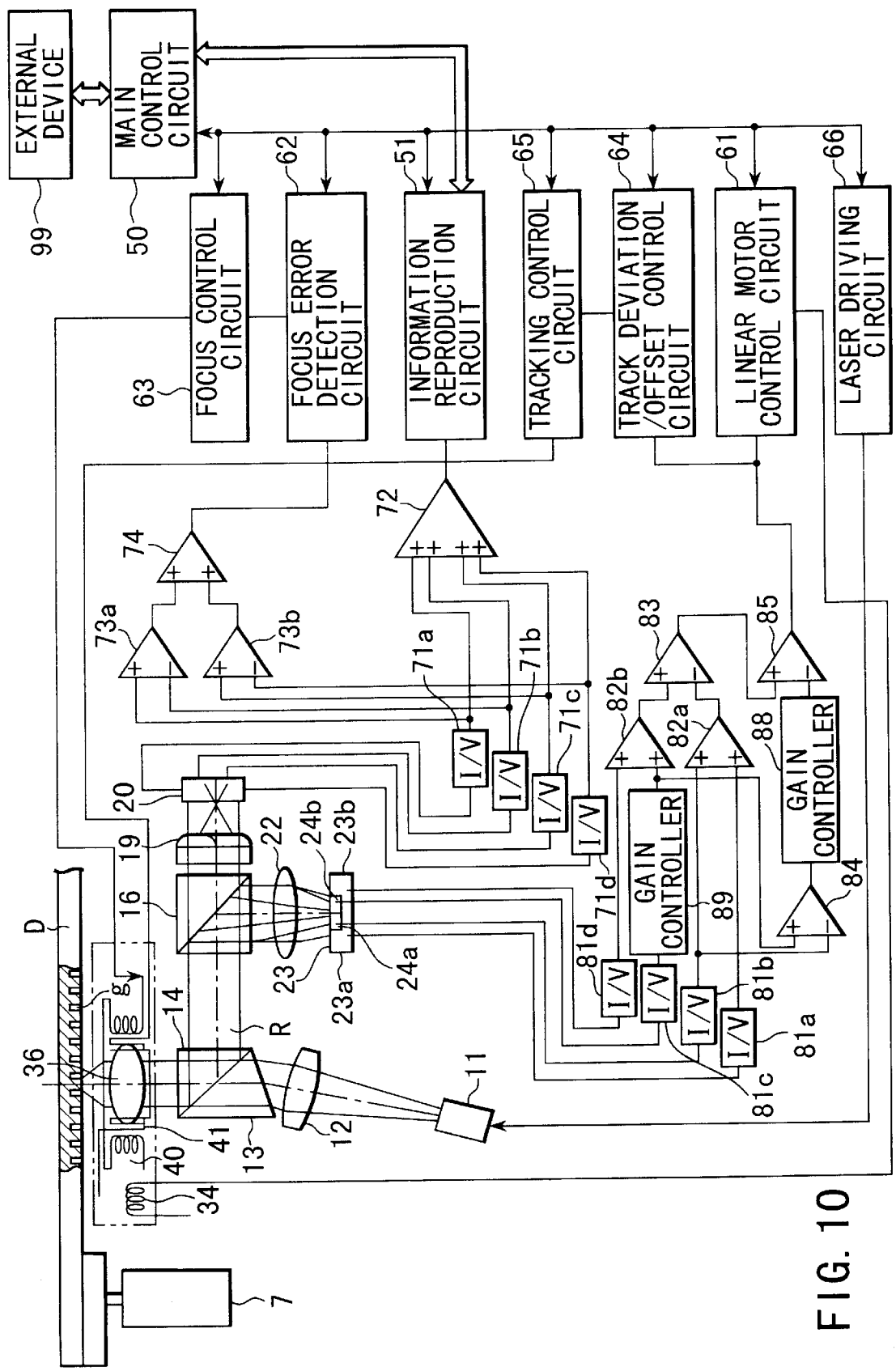
FIG. 10 is a schematic block diagram showing a signal processing section and a control section different from those shown in FIGS. 8 and 9.

The signal processing section shown in FIG. 10 further includes gain controllers 89 and 88. The gain controller 89 adjusts the output gain of one of outputs from the strip-like regions 24a and 24b (the output from the strip-like region 24b in this case) respectively contained in the output obtained by the adder 82a by adding an output from the light-receiving region 23a of the photodetector 23, i.e., an output from the fifth current-voltage converter 81a, to an output from the strip-like region 24a, i.e., an output from the sixth current-voltage converter 81b, and the output obtained by the adder 82b by adding an output from the light-receiving region 23*b*, i.e., an output from the seventh current-voltage converter 81*c*, to an output from the strip-like region 24*b*, i.e., the eighth current-voltage converter 81*d*, in accordance with the output gain of the other output. The gain controller 88 performs gain adjustment such that the output level of one of the first and second difference signals (the second difference signal in this case) added by the differential amplifier 85 matches the output level of the other difference signal.

According to this arrangement, any deviation of an optimal push-pull signal amplitude or correction signal amplitude from a reference value, which occurs when the behavior of the diffracted light components of the respective orders varies due to, for example, an error in the groove pitch of the optical disk, the wavelength of a laser beam, the numerical aperture of the objective lens, or the area of each light-receiving region, can be arbitrarily compensated for. This can further improve the offset reducing effect of a tracking error signal. Obviously, one of the gain controllers 89 and 88 can be omitted, as needed.

Figure 7:
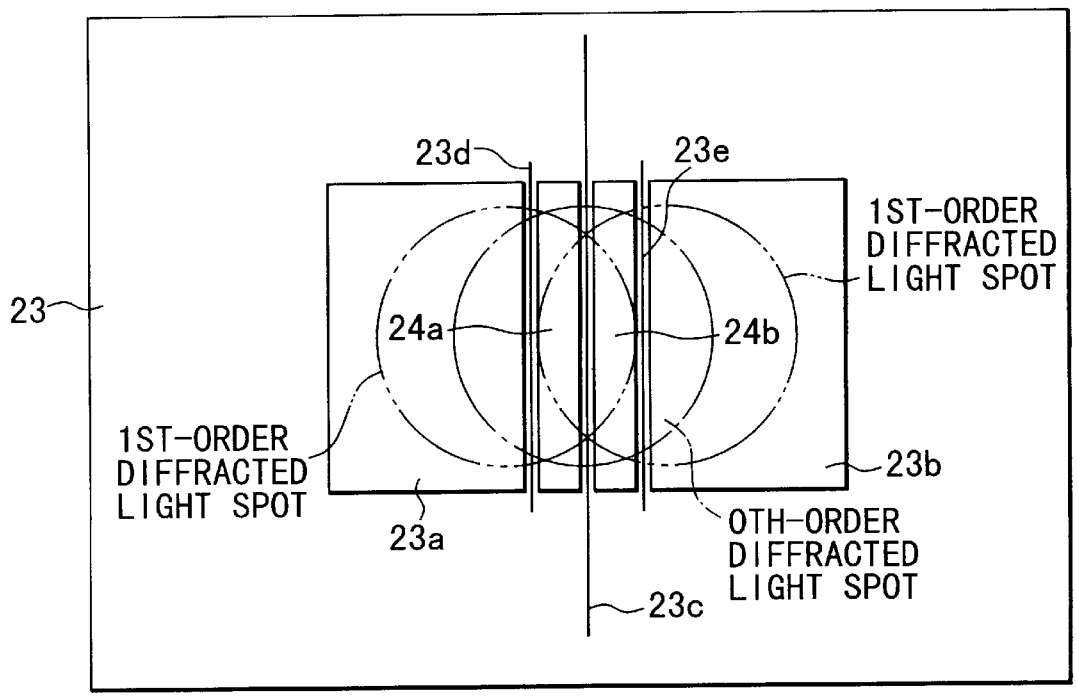
FIG. 7 is a schematic plan view showing the detection regions of the photodetector which can detect the offset component contained in the reflected laser beam in FIG. 6 and is used to detect a track deviation.
Figure 11:
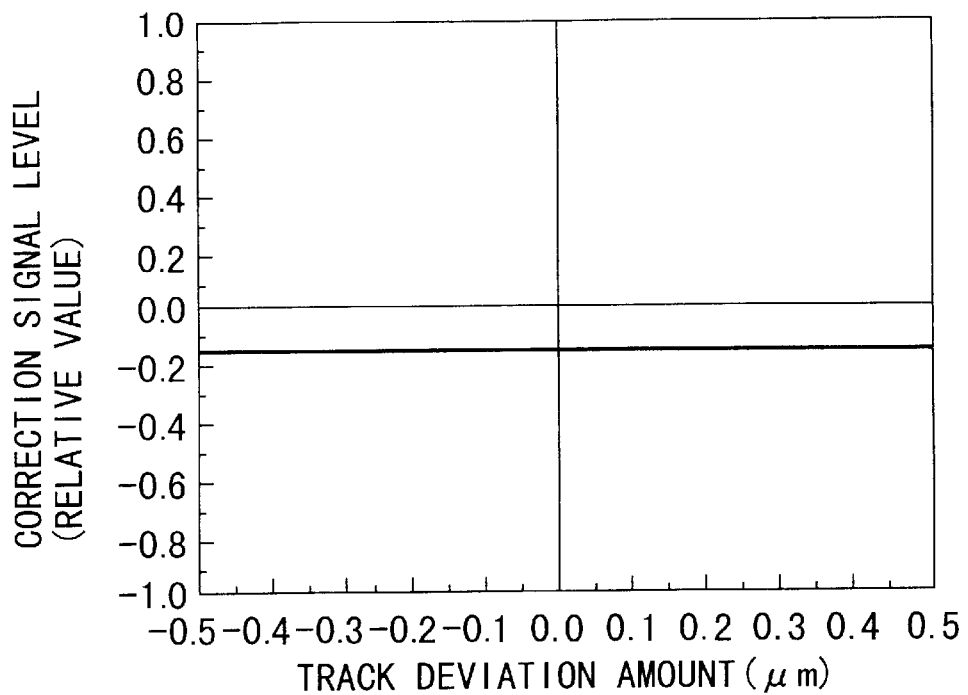
FIG. 11 is a graph showing the offset amount obtained by the photodetector in FIG. 7.
Figure 12:
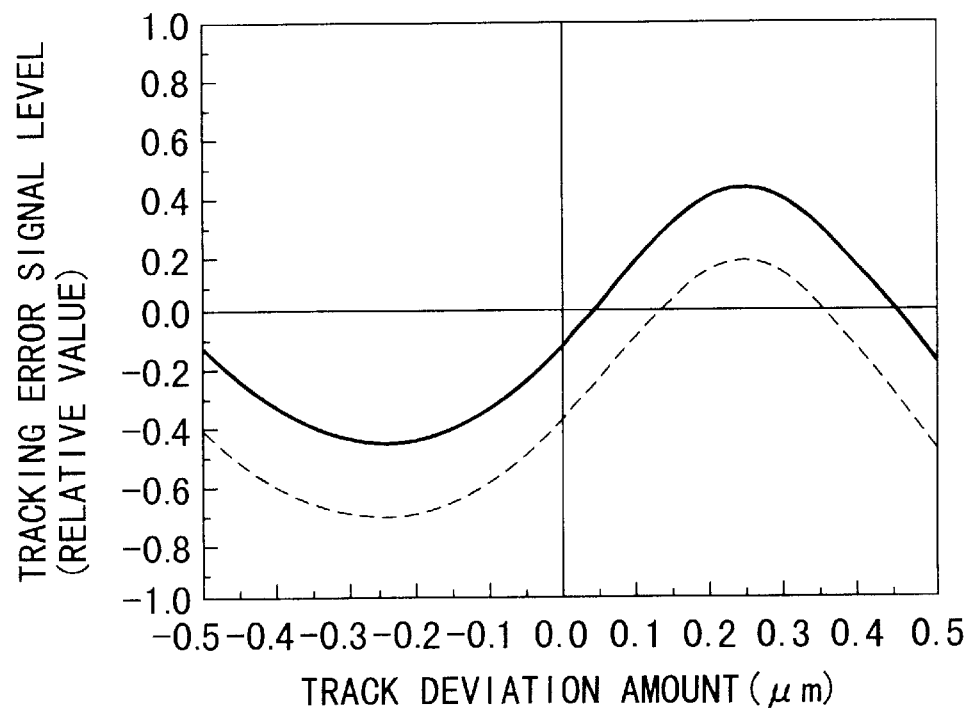
FIG. 12 is a graph showing the output from the photodetector in FIG. 7 and the track deviation signal provided by the signal processing section and the control section in FIG. 8.

FIGS. 11 and 12 are graphs respectively showing the output from the photodetector in FIG. 7 and the tracking error signal provided by the signal processing section and the control section in FIG. 8.

As is obvious from FIG. 12, the central value of the track deviation signal input to a tracking control circuit 65 can be brought close to 0, as compared with a conventional tracking error signal influenced by a lens shift and indicated by the dashed line in FIG. 12, by removing the offset component contained in the track deviation signal output from the light-receiving regions 23*a* and 23*b* of the photodetector 23 by the track deviation/offset detection circuit 64 using outputs from the strip-like regions 24*a* and 24*b* of the photodetector 23.

Figure 13:
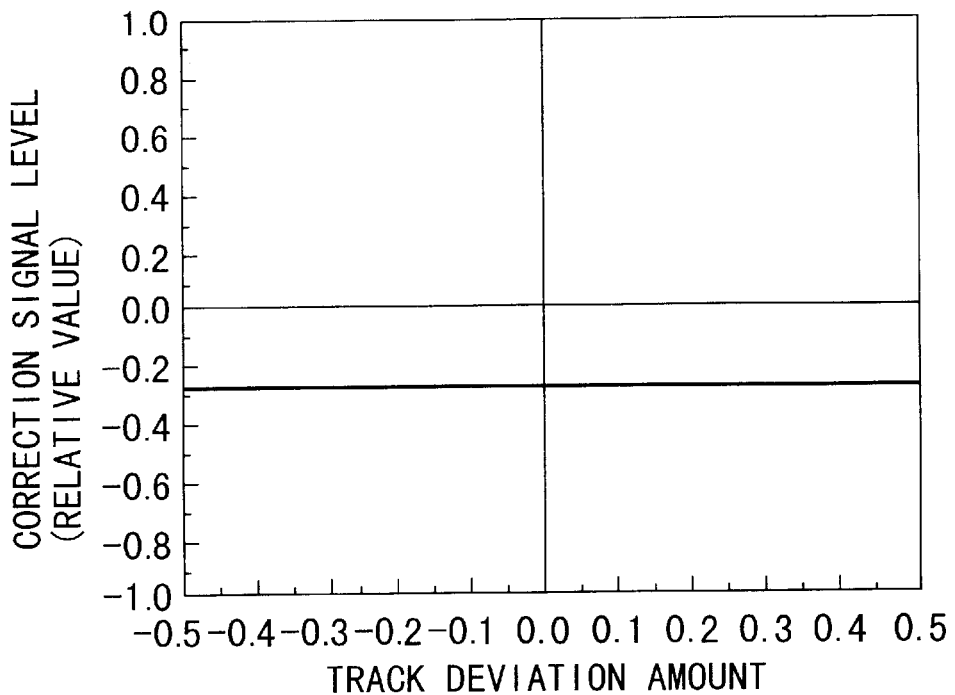
FIG. 13 is a graph showing the offset amount obtained by the photodetector in FIG. 7 and the signal processing section and the control section in FIG. 8.
Figure 14:
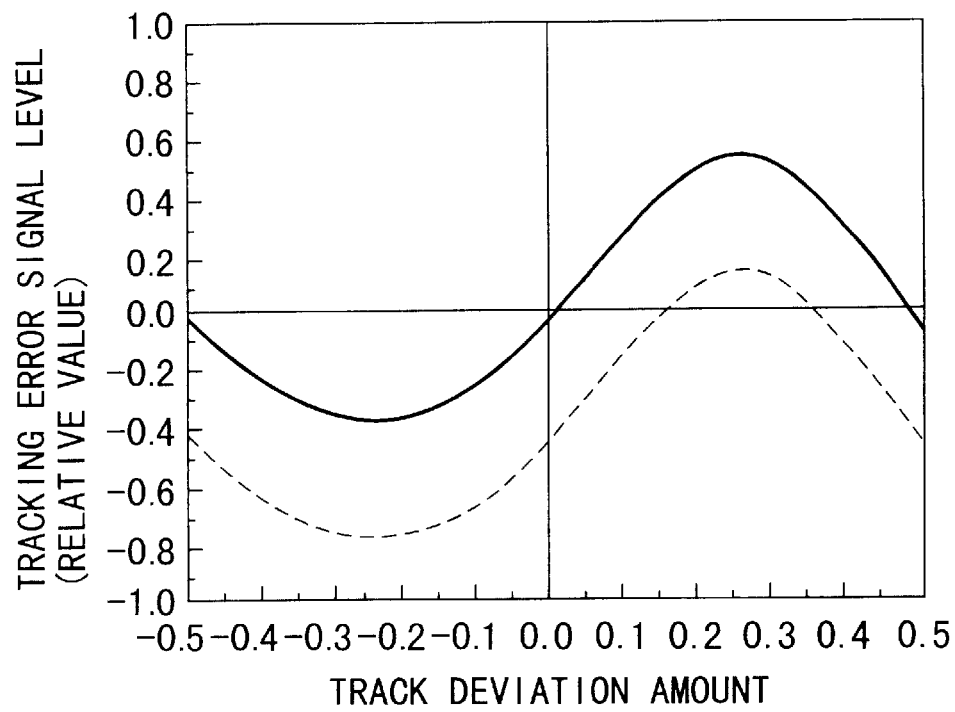
FIG. 14 is a graph showing the output from the photodetector in FIG. 7 and the track deviation signal provided by the signal processing section and the control section in FIG. 8.

FIGS. 13 and 14 are graphs showing the output from the photodetector in FIG. 7 and the tracking error signal provided by the signal processing section and the controls section in FIG. 8.

As is apparent from FIG. 14, the central value of the track deviation signal input to the tracking control circuit 65 can be approximated to 0, as compared with the conventional tracking error signal influenced by a lens shift and indicated by the dashed line in FIG. 14, by removing an offset component from the track deviation signal output from the light-receiving regions 23*a* and 23*b* of the photodetector 23 by the track deviation/offset detection circuit 64 using outputs from the strip-like regions 24*a* and 24*b* of the photodetector 23, and also removing the output associated with an element that causes an apparent change in the magnitude of an output level owing to the difference between the areas of the light-receiving regions 23*a* and 23*b* of the photodetector 23, a deviation of the output level unique to the optical head apparatus 3, the differences between the output levels of the light-receiving regions 23*a* and 23*b* and the regions 24*a* and 24*b*, and the like. Referring to FIG. 14, the ordinate represents the level of the tracing error signal; levels of 1.0 and −1.0 correspond to a case wherein when all light incident on the optical disk D is reflected by the optical disk D, and all the light is launched into one of the two light-receiving regions of the photodetector. As is obvious from this graph, when the conventional photodetector is used, a large track offset is generated by a lens shift.

A case wherein the photodetector having the divided regions in FIG. 7 and the signal processing system in FIG. 8 are applied to a header signal using a land/groove recording method will be described in detail next.

Figure 15:
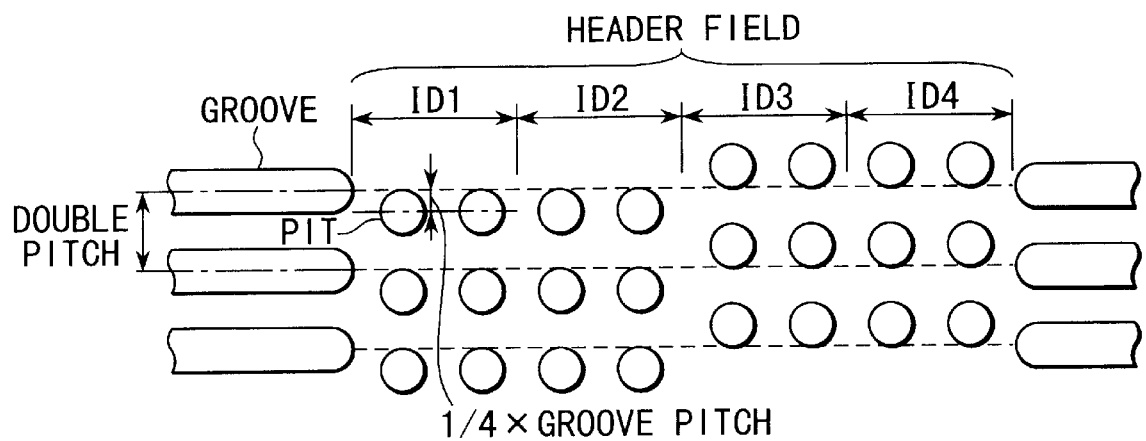
FIG. 15 is a schematic view showing the relationship between the header fields, grooves, and pits of the optical disk used for land/groove recording.

In the land/groove recording method, as schematically shown in FIG. 15, a total of four groups of pit rows, each including two pit rows, are formed in the optical disk D with header fields being respectively shifted to the inner and outer peripheral sides by ¼ the groove pitch, in a many case.

In a method of a representation of the header signal from the reflected laser beam reflected from the header portion mentioned above, in occurs problems described rater, when the lens shift is applied.

According to the optical disk D on which information is recorded by the land/groove recording method, if, for example, the focused beam spot is located on a groove, the reproduction signals from the first and second header fields (to be referred to as ID1 and ID2, respectively) in FIG. 15 appear waveforms having positive polarity, and the reproduction signals from the third and fourth header fields (to be referred to as ID3 and ID4, respectively) appear as waveforms having negative polarity. If the focused beam spot is located on a land, the reproduction signals from ID1 and ID2 appear as waveforms having negative polarity, and the reproduction signals from ID3 and ID4 appear as waveforms having positive polarity. Need less to say, the header signals ID1, ID2, ID3 and ID4 are created from a difference signal outputted from a known 2-split detectors.

Figure 16:
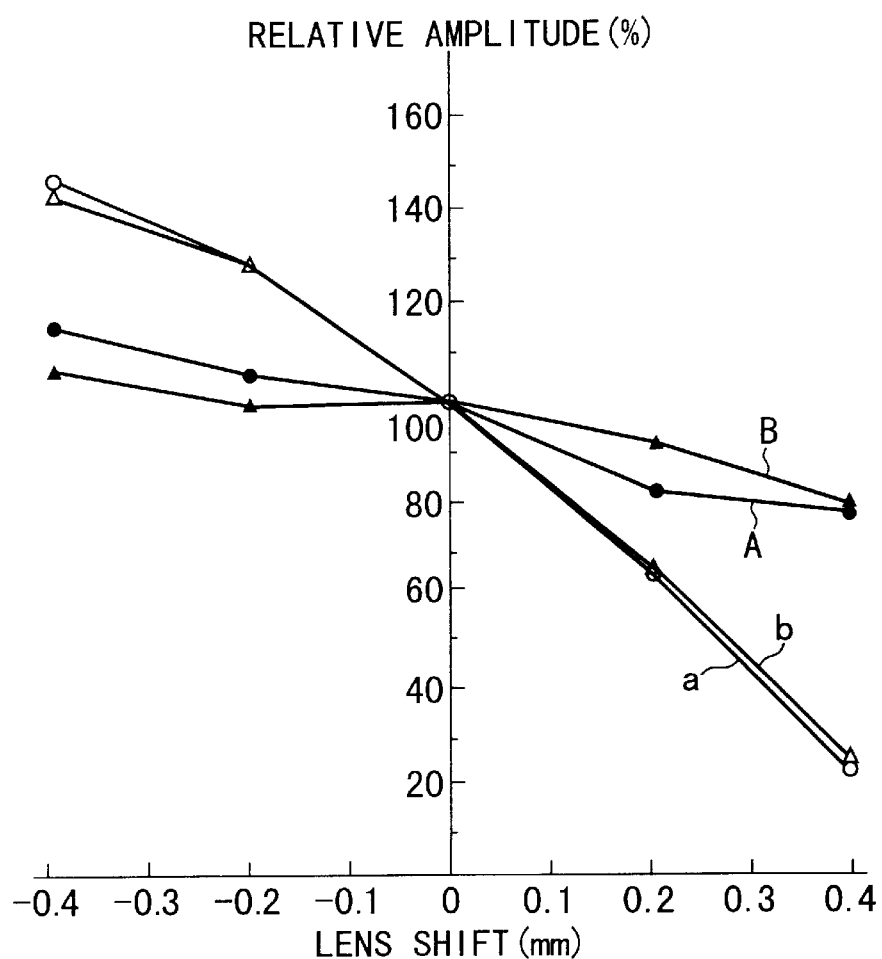
FIG. 16 is a graph showing the simulation results concerning the behavior of the amplitude of the header signal reproduced from a header field of the optical disk on which information is recorded by land/groove recording upon an increase in lens shift.
Figure 26:
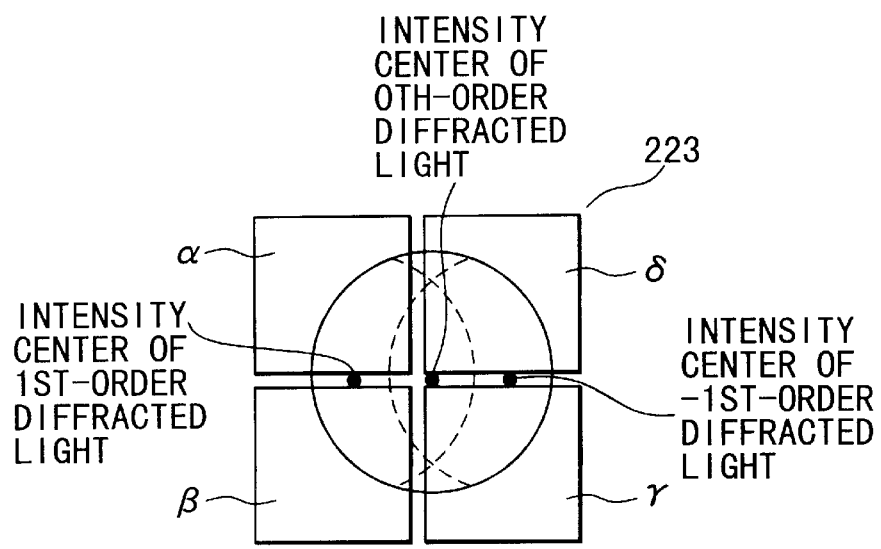
FIG. 26 is a schematic view for explaining how the intensity center of 0th-order diffracted light deviates from the division center of the detection regions of a conventional, known 4-split photodetector.

When, therefore, a header represence signal is to be obtained by using a known 4-split photodetector like the one shown in FIG. 26 or the known 2-split photodetector (not shown) in the presence of a lens. shift, there is a large difference between the two signal levels obtained when reflected laser beams are launched into the photodetector at asymmetrical positions with respect the division line of the photodetector. Note that curves a and b in FIG. 16 indicate the simulation results concerning the behavior of the amplitude of a header signal outputted from the known 4- or 2-slip detectors upon an increase in lens shift. Referring to FIG. 16, the curve a indicates a case wherein the pit length is 0.64 $\mu$m; and the curve b, a case wherein the pit length is 0.83 $\mu$m. Note that the curves a and b in FIG. 16 indicate the results obtained from one of pairs of ID1 and ID2, and ID3 and ID4. If signals are obtained from the other pair of header fields, the resultant curves and the above curves become symmetrical about the ordinate in FIG. 16. According to FIG. 16, the amount of the one of the header signal is increased in an one side of the lens shift, and is decreased in an other of side of the lens shift in accordance with outputs ID1 and ID2 or ID3 and ID4. The calculation conditions used for the simulations are: a wavelength $\lambda$ of a laser beam from the semiconductor laser=660 nm; the aperture ratio of the objective lens=0.60; the groove pitch of the optical disk=1.48 $\mu$m, the pit depth= 70 nm; and the thickness of the optical disk=0.6 mm. Note that the intervals between the pits are set to be equal to the length of each pit.

In contrast to the above results, with the use of the 4-split photodetector in FIG. 7 and the signal processing system in FIG. 8, changes in the amplitudes of header signals indicated by curves A and B in FIG. 16 are observed. The curve A indicates a case wherein the pit length is 0.64 $\mu$m; and the curve B, a case wherein the pit length is 0.83 $\mu$m.

As is obvious from FIG. 16, the changes in relative amplitude are reduced to ½ or less those indicated by the curves a and b in spite of the fact that some lens shift is added to realize a high-speed seek.

The reason why changes in relative amplitude can be improved as shown in FIG. 16 will be described below.

If the grooves of the optical disk D and the pit rows in the header fields are formed as shown in FIG. 15, each pit is shifted to the inner or outer peripheral side when viewed from the center of the groove. For this reason, most of the AC component in a header signal is obtained as a change in the intensity of diffracted light due to a substantially half portion of the focused spot on the inner or outer peripheral side.

As described above, when a lens shift is present, the intensity center of the 0th-order diffracted light of the laser beam reflected by the optical disk D and reaching the detection surface of the photodetector 23 is shifted thereon.

As described with reference to FIG. 8 (FIGS. 9 and 10), however, since an output from the region where 0th-order diffracted light, 1st-order diffracted light, and −1st-order diffracted light, each of diffracted light presents direction is a direction of a radius direction of the optical disk, overlap is not used for detection of the header signal, even if the intensity center of the 0th-order diffracted light of the reflected laser beam incident on the photodetector 23 is shifted by a lens shift, the header signal is essentially free from the influence of the lens shift as long as the shift amount falls within the range defined by the two light-receiving regions 24a and 24b near the middle portion of the photodetector 23. Note that the distance between the two light-receiving regions 24a and 24b, i.e., the division lines 23d and 23e, is set to about ⅓ the diameter of the focused spot provided by 0th-order diffracted light, e.g., about 0.001 mm. The header signal is obtained from an output from the differential amplifier 85 of the signal processing section shown in FIG. 8.

Figure 17:
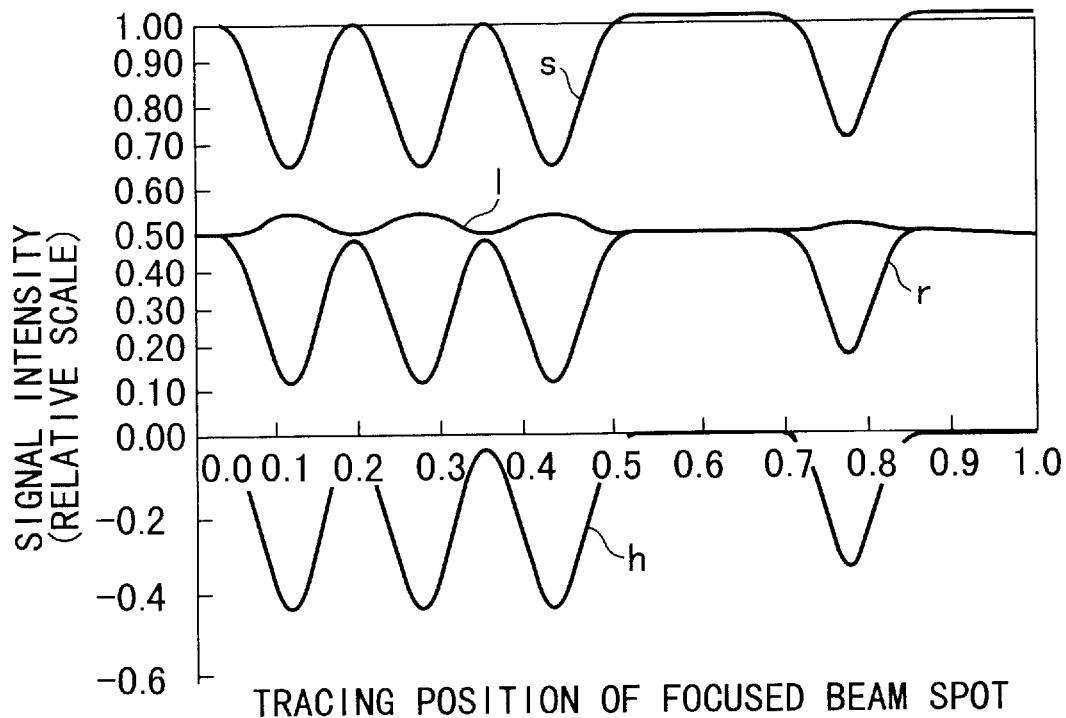
FIG. 17 is a graph showing the result obtained by calculating variations in header signal by using a known conventional 2-split photodetector (not shown) assuming that the lens shift amount is "0"
Figure 19:
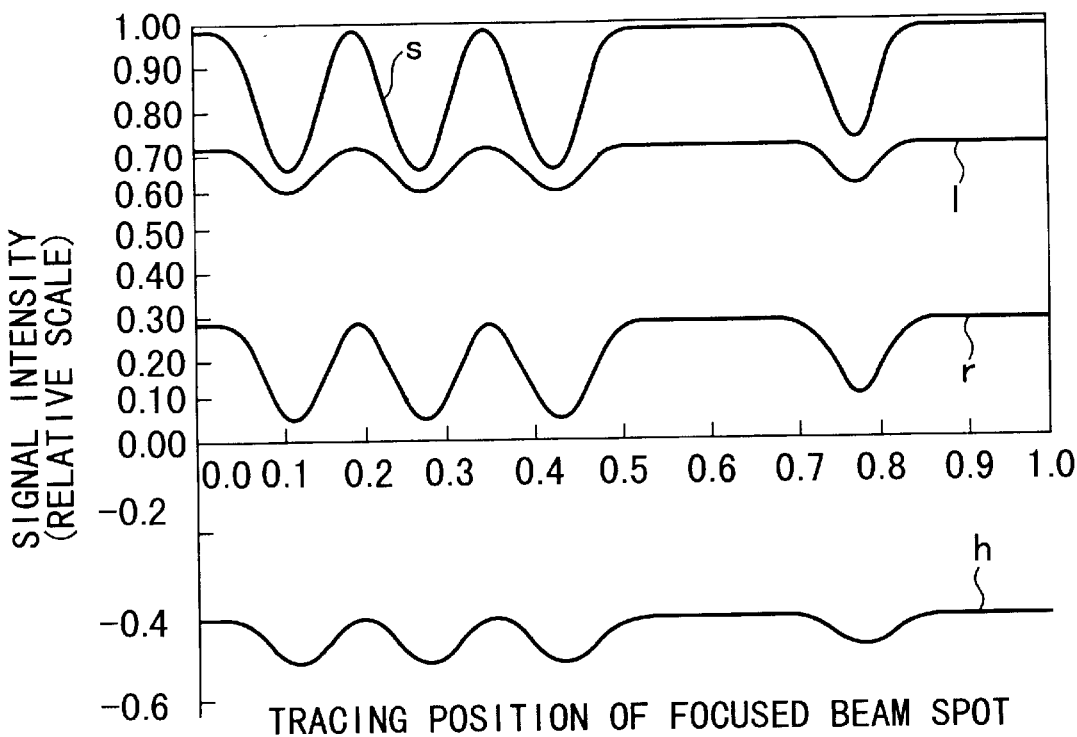
FIG. 19 is a graph showing the result obtained by calculating variations in header signal by using a conventional 2-split photodetector (not shown) assuming that the lens shift is 10% the aperture ratio of the objective lens and is on the inner peripheral side of a groove.
Figure 21:
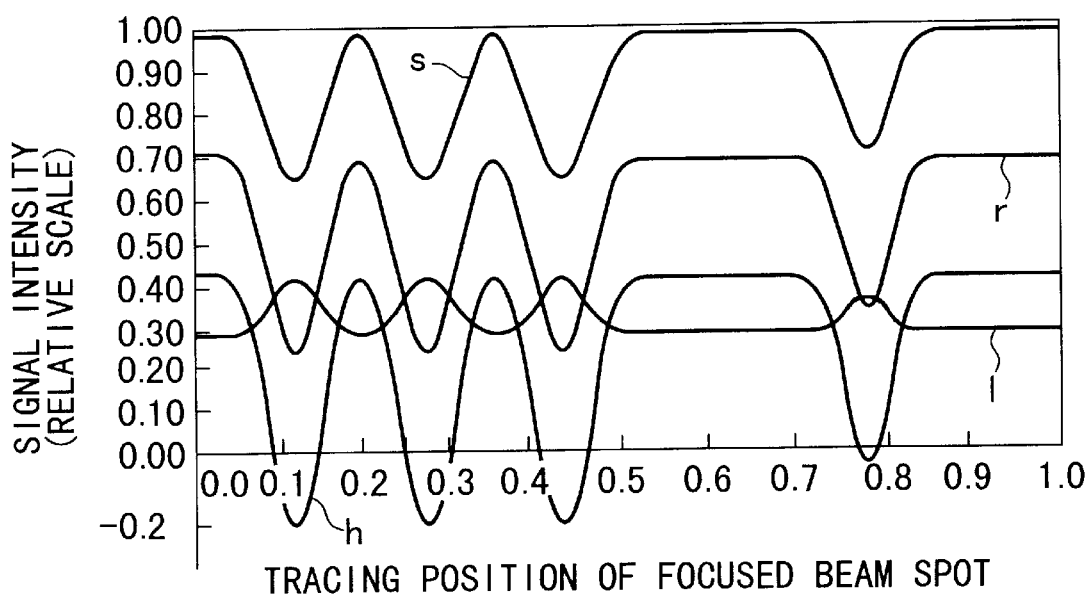
FIG. 21 is a graph showing the result obtained by calculating variations in header signal by using the conventional 2-split photodetector (not shown) assuming that the lens shift is 10% the aperture ratio of the objective lens and is on the outer peripheral side of a groove.
Figure 22:
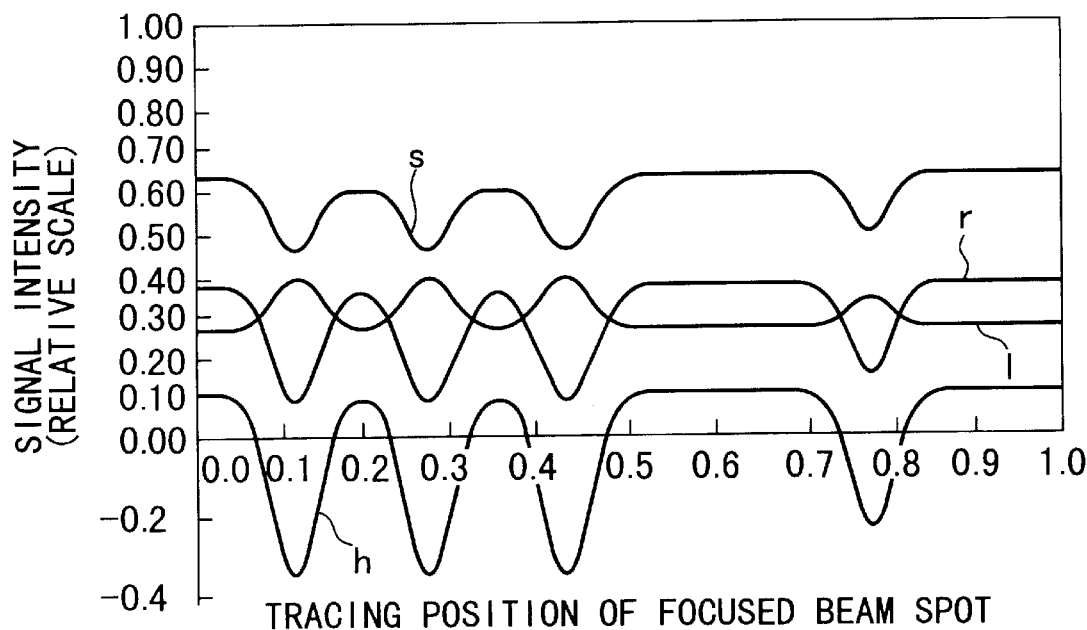
FIG. 22 is a graph showing the result obtained by calculating variations in header signal by using the 4-split photodetector of the present invention in FIG. 7 assuming that the lens shift is 10% the aperture ratio of the objective lens and is on the outer peripheral side of a groove.

FIG. 17 is a graph showing, for comparison, the result obtained by calculating variations in header signal by using a known 2-split photodetector, which is divided in directions perpendicular and parallel to the groove shadow projected on the photodetector, assuming that the lens shift amount is "0". A curve h indicates the output level of the header signal; a curve r, the sum (i.e., a signal) of outputs from the two detection regions located on the right side of the groove shadow, as an axis of symmetry, projected on the photodetector; a curve l, the sum (i.e., a signal) of outputs from the two detection regions located on the left side of the groove shadow, as an axis of symmetry, projected on the photodetector; and a curve s, the sum total of the outputs from all the detection regions. Note that the abscissa represents the position of the focused beam spot in tracing several pits; and the ordinate, the level of the reproduction signal as a relative value. FIGS. 19 and 21 are graphs showing the calculated values obtained by calculating the magnitudes of variations in header signal in a case wherein the conditions that the magnitude of the lens shift is 10% of the aperture ratio of the objective lens, and the lens shift is on the inner and outer peripheral sides of a line of pit marks are added to the conditions shown in FIG. 17.

Figure 18:
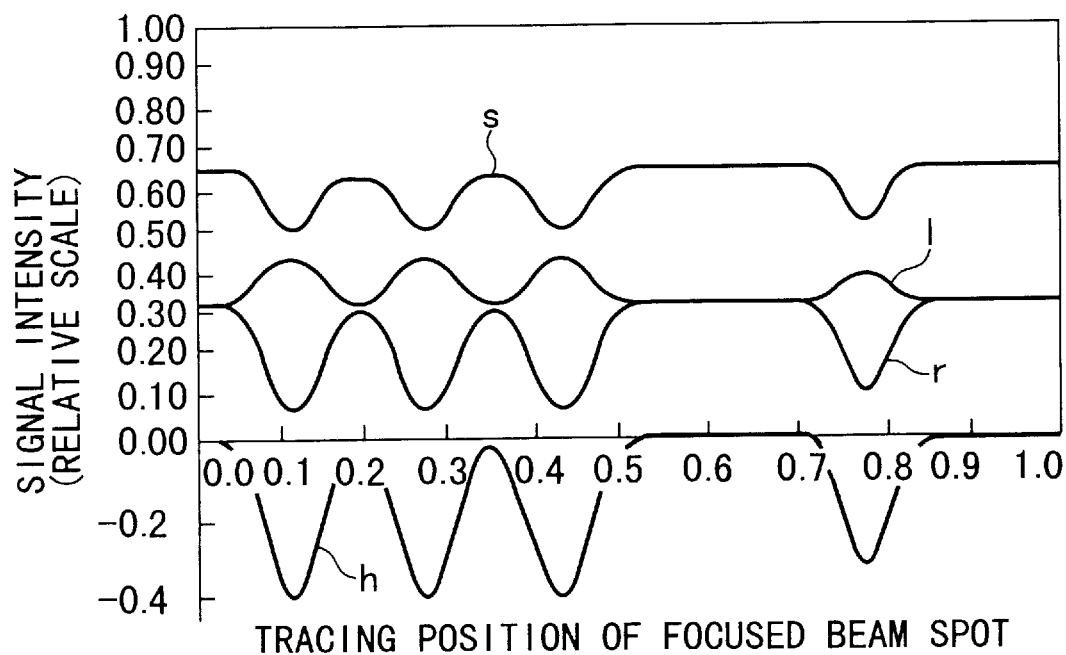
FIG. 18 is a graph showing the result obtained by calculating variations in header signal by using the 4-split photodetector of the present invention in FIG. 7 assuming that the lens shift amount is "0"

FIG. 18 is a graph showing the result obtained by calculating variations in header signal, assuming that the lens shift amount is "0", by using outputs from the two outer detection regions of the four detection regions of the photodetector according to this embodiment of the present invention in FIG. 7, which is divided into four regions in a direction parallel to the groove shadow projected on the photodetector. The respective curves indicate the following conditions. A curve h indicates the output level of the header signal; a curve r, an output signal from the detection region 23b located on the right side of the groove shadow, as an axis of symmetry, projected on the photodetector 23; a curve l, an output signal from the detection region 23a located on the left side of the groove shadow, as an axis of symmetry, projected on the photodetector 23; and a curve s, the sum total of the outputs from the detection regions 23a and 23b. The remaining conditions are the same as those in FIG. 17.

Figure 20:
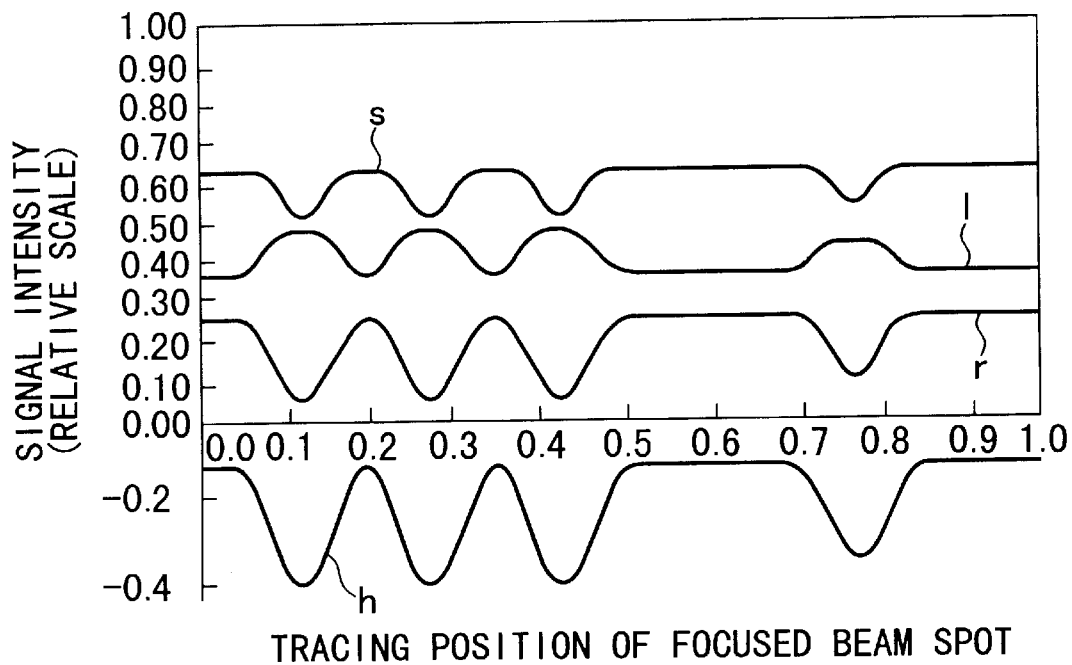
FIG. 20 is a graph showing the result obtained by calculating variations in header signal by using the 4-split photodetector of the present invention in FIG. 7 assuming that the lens shift is 10% the aperture ratio of the objective lens and is on the inner peripheral side of a groove.

FIG. 20 is a graph showing the result obtained by calculating variations in header signal in a case wherein the condition that a lens shift 10% the aperture ratio of the objective lens is present toward the inner peripheral side of a groove is added to the conditions shown in FIG. 18. The conditions indicated by the respective curves are denoted by the same reference symbols as those in FIG. 18.

FIG. 21 is a graph showing the result obtained by calculating variations in header signal in a case wherein the condition that a lens shift 10% the aperture ratio of the objective lens is present toward the outer peripheral side of a groove is added to the conditions shown in FIG. 20. The conditions indicated by the respective curves are denoted by the same reference symbols as those in FIG. 20.

As is obvious from FIGS. 17 to 22, the following effects are obtained, as described above.

A) Each of magnitude of the header signal (curve h) are same (present invention to known outputs); and B) The magnitude of the variation (curve h) of the reproduction signal is greatly reduced.

This embodiment prevents the header signal from being buried in other signals, and can reduce variations in the magnitude of the reproduction signal.

According to this embodiment, even if a lens shift is present, a header signal can be obtained, which varies less than that obtained by using the known 2-split photodetector in FIG. 17, and can be approximated at the signal obtained when the lens shift amount is "0" as shown in FIG. 20 without requiring any special correction.

In the state wherein a total of four header fields, i.e., the first, second, third, and fourth header fields, are unevenly distributed in pairs in the inner and outer peripheral directions of the optical disk with respect to the center of a groove, as shown in FIG. 15, letting $L_{VFO}$ be the signal amplitude at the VFO portion of the pre-pits in a header field, $L_O$ be the signal level at that mirror portion, of the recording surface of the optical disk, on which no information is recorded, and $L_{hmax}$ be the maximum value of the signal amplitudes at the header field, the above calculation results satisfy $L_{VFO}/L_O \geq 0.25$, and $L_{VFO}/L_{hmax} \geq 0.50$.

In addition, letting $L_{AMHD1}$ be the maximum value of signal amplitudes from the first header field, $L_{AMHD2}$ be the maximum value of signal amplitudes from the second header field, $L_{AMHD3}$ be the maximum value of signal amplitudes from the third header field, and $L_{AMHD4}$ be the maximum value of signal amplitudes from the fourth header field, the calculation results satisfy $0.9 \leq L_{AMHD2}/L_{AMHD1} \leq 0.1$, $0.9 \leq L_{AMHD4}/L_{AMHD3} \leq 0.1$, $0.8 \leq L_{AM13}/L_{AMHD1}$, and $0.8 \leq L_{AM31}/L_{AMHD3}$. Furthermore, letting $L\alpha_{HD1}$ be the level of the difference between the upper limit value of the signals from the VFO portion (not shown) in the signals from the first header field, and the upper limit value of all the header signals when a focused beam spot is located on a groove, and the level of the difference between the lower limit value of the signals from the VFO portion (not shown) in the signals from the first header field and the lower limit value of all the header signals when the focused beam spot is located on a land, $L\alpha_{HD2}$ be the level of the difference between the upper limit value of the signals from the VFO portion (not shown) in the signals from the second header field, and the upper limit value of all the header signals when a focused beam spot is located on a groove, and the level of the difference between the lower limit value of the signals from the VFO portion (not shown) in the signals from the second header field and the lower limit value of all the header signals when the focused beam spot is located on a land, $L\alpha_{HD3}$ be the level of the difference between the upper limit value of the signals from the VFO portion (not shown) in the signals from the third header field, and the upper limit value of all the header signals when the focused beam spot is located on a groove, and the level of the difference between the lower limit value of the signals from the VFO portion (not shown) in the signals from the third header field and the lower limit value of all the header signals when the focused beam spot is located on a land, $L\alpha_{HD4}$ be the level of the difference between the upper limit value of the signals from the VFO portion (not shown) in the signals from the fourth header field, and the upper limit value of all the header signals when the focused beam spot is located on a groove, and the level of the difference between the lower limit value of the signals from the VFO portion (not shown) in the signals from the fourth header field and the lower limit value of all the header signals when the focused beam spot is located on a land, $L\beta_{HD1}$ be the level of the difference between the lower limit value of the signals from the VFO portion (not shown) in the signals from the first header field, and the lower limit value of all the header signals when a focused beam spot is located on a groove, and the level of the difference between the upper limit value of the signals from the VFO portion (not shown) in the signals from the first header field and the upper limit value of all the header signals when the focused beam spot is located on a land, $L\beta_{HD2}$ be the level of the difference between the lower limit value of the signals from the VFO portion (not shown) in the signals from the second header field, and the lower limit value of all the header signals when the focused beam spot is located on a groove, and the level of the difference between the upper limit value of the signals from the VFO portion (not shown) in the signals from the second header field and the upper limit value of all the header signals when the focused beam spot is located on a land, $L\beta^{HD3}$ be the level of the difference between the lower limit value of the signals from the VFO portion (not shown) in the signals from the third header field, and the lower limit value of all the header signals when the focused beam spot is located on a groove, and the level of the difference between the upper limit value of the signals from the VFO portion (not shown) in the signals from the third header field and the upper limit value of all the header signals when the focused beam spot is located on a land, and $L\beta_{HD4}$ be the level of the difference between the lower limit value of the signals from the VFO portion (not shown) in the signals from the fourth header field, and the lower limit value of all the header signals when the focused beam spot is located on a groove, and the level of the difference between the upper limit value of the signals from the VFO portion (not shown) in the signals from the fourth header field and the upper limit value of all the header signals when the focused beam spot is located on a land, the calculation results satisfy $-0.1 \leq L\beta_{HD1}/L\alpha_{HD1}/2L_{AMHD1} \leq 0.1$,
$-0.1 \leq L\beta_{HD2}/L\alpha_{HD2}/2L_{AMHD1} \leq 0.1$,
$-0.1 \leq L\beta_{HD3}/L\alpha_{HD3}/2L_{AMHD1} \leq 0.1$, and
$-0.1 \leq L\beta_{HD4}/L\alpha_{HD3}/2L_{AMHD1} \leq 0.1$.

In addition, letting $L_{HD1}$ be the lower limit level of the amplitude of the signal obtained by photoelectrically converting the light beam reflected by the first header field and launched into the photodetector, $L_{HD2}$ be the lower limit level of the amplitude of the signal obtained by photoelectrically converting the light beam reflected by the second header field and launched into the photodetector, $L_{HD3}$ be the lower limit level of the amplitude of the signal obtained by photoelectrically converting the light beam reflected by the third header field and launched into the photodetector, and $L_{HD4}$ be the lower limit level of the amplitude of the signal obtained by photoelectrically converting the light beam reflected by the fourth header field and launched into the photodetector, the calculation results satisfy $|[(L_{HD1}+L_{HD2})-(L_{HD3}+L_{HD4})]/2L_0| \leq 0.05$.

Moreover, when the focused beam spot is offset from the center of the groove by 0.1 μm in the radial direction of the information recording medium, $0.15 \leq |[(L_{HD1}+L_{HD2})-(L_{HD3}+L_{HD4})]/2L_0|$.

Figure 23:
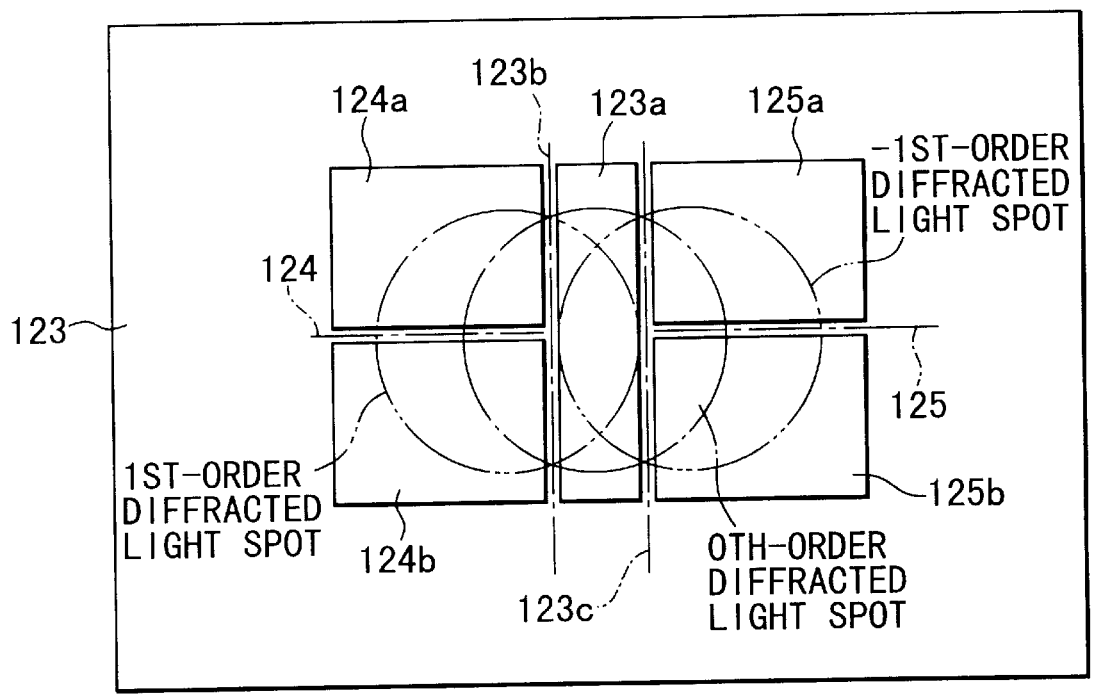
FIG. 23 is a schematic plan view showing another embodiment of the detection regions of the photodetector that can detect the offset component contained in the reflected laser beam in FIG. 6 and is used to detect a track deviation.

FIG. 23 is a schematic plan view showing the characteristics of the light-receiving regions of another photodetector that can replace the 4-split photodetector shown in FIG. 7.

First of all, device in characteristics of phase difference tracking error signal (hereinafter referred to as "PDP signal") will be explained. The PDP signal is indispensable for a tracking error detection method to reproduce signals recorded in a lead-in portion in the header area in a DVD-RAM disk, for instance.

As shown in FIG. 23, a photodetector 123 includes a first detection region 123a corresponding to the region where all 0th-order diffracted light, 1st-order diffracted light, and −1st-order diffracted light passing through substantially the entire portion of the objective lens 36 overlap each other, second and third detection regions 124a and 124b aligned along the first detection region 123a to be respectively located on the outer and inner sides of the groove g projected on the first detection region 123a, and fourth and fifth detection regions 125a and 125b. The first detection region 123a is defined by first and second parallel division lines 123b and 123c. The second and third detection regions 124a and 124b, and the fourth and fifth detection regions 125a and 125b, are respectively defined by division lines 124 and 125 defined in a direction perpendicular to the division lines 123b and 123c.

Figure 24:
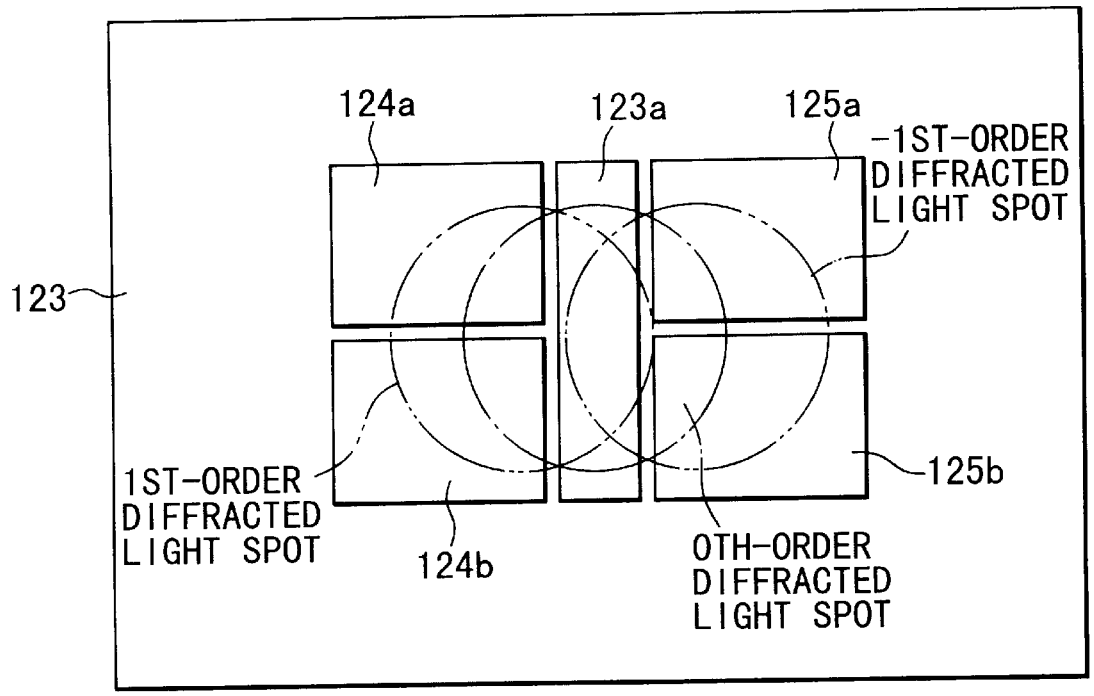
FIG. 24 is a schematic view showing a state wherein light is incident on the photodetector in FIG. 23 while the intensity center of the 0th-order diffracted light deviates from the division center of the detection regions.

The areas of the second and third detection regions 124a and 124b and the fourth and fifth detection regions 125a and 125b of the photodetector 123 shown in FIG. 23 are set (by the division lines 123b and 123c in a direction parallel to the above groove) such that even if the displacement component resulting from a lens shift is added to the reflected laser beam from the optical disk D, almost no variation in light intensity occurs in any of the second, third, fourth, and fifth detection regions 124a, 124b, 125a, and 125b. For example, as shown in FIG. 24, the influence of the offset component in the track deviation signal of the PDP signal can be eliminated by setting the size of the first detection region 123a so as to prevent the reflected laser beam in the region where all 0th-order diffracted light, 1st-order diffracted light, and −1st-order diffracted light overlap each other from entering any of the second to fifth detection regions 124a, 124b, 125a, and 125b.

Figure 25:
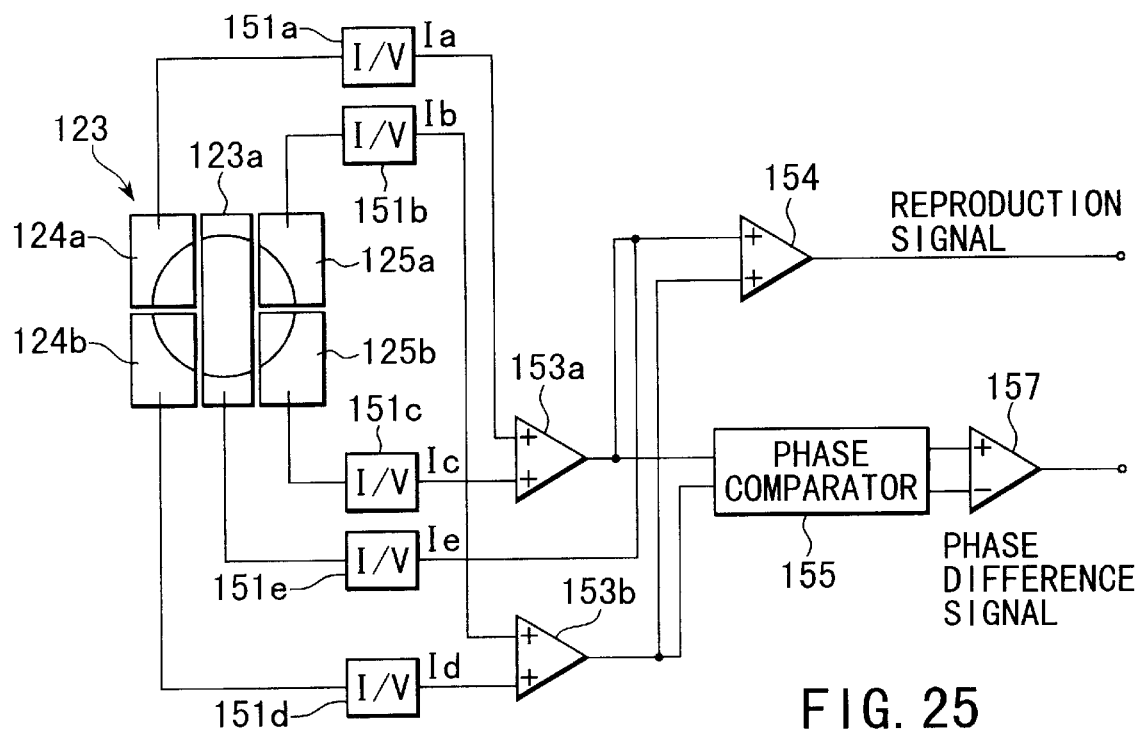
FIG. 25 is a schematic block diagram showing a signal processing system for processing an output signal from the photodetector in FIG. 23.

FIG. 25 is a schematic view showing an example of the signal processing system used to process the detection signal obtained by the photodetector 123 in FIG. 23, which includes the first to fifth detection regions 123a, 124a, 124b, 125a, and 125b.

As shown in FIG. 25, photoelectrically converted signals from the second to fifth detection regions 124a, 124b, 125a, and 125b, and more specifically, the detection regions at diagonal positions, i.e., the detection regions 124a and 125b and the detection regions 124b and 125a, are current-voltage-converted by current-voltage conversion circuits 151a, 151b, 151c, and 151d, and the resultant signals are added by first and second adders 153a and 153b to obtain two sum signals ("1a+1c" and "1b+1d"; to be respectively referred to as first and second diagonal sum signals hereinafter).

As will be described later, a track deviation signal free from the influence of a lens shift can be obtained by subtracting and conpalating of each phases of the second diagonal sum signal, i.e., the output from the second adder 153b, from the first diagonal sum signal, i.e., the output from the first adder 153a.

The reason why the offset produced upon occurrence of a lens shift can be reduced by the above 5-split photodetector 123 will be described next.

FIG. 26 shows a known 4-split photodetector that is often used as a photodetector for detecting track deviation.

Figure 6:
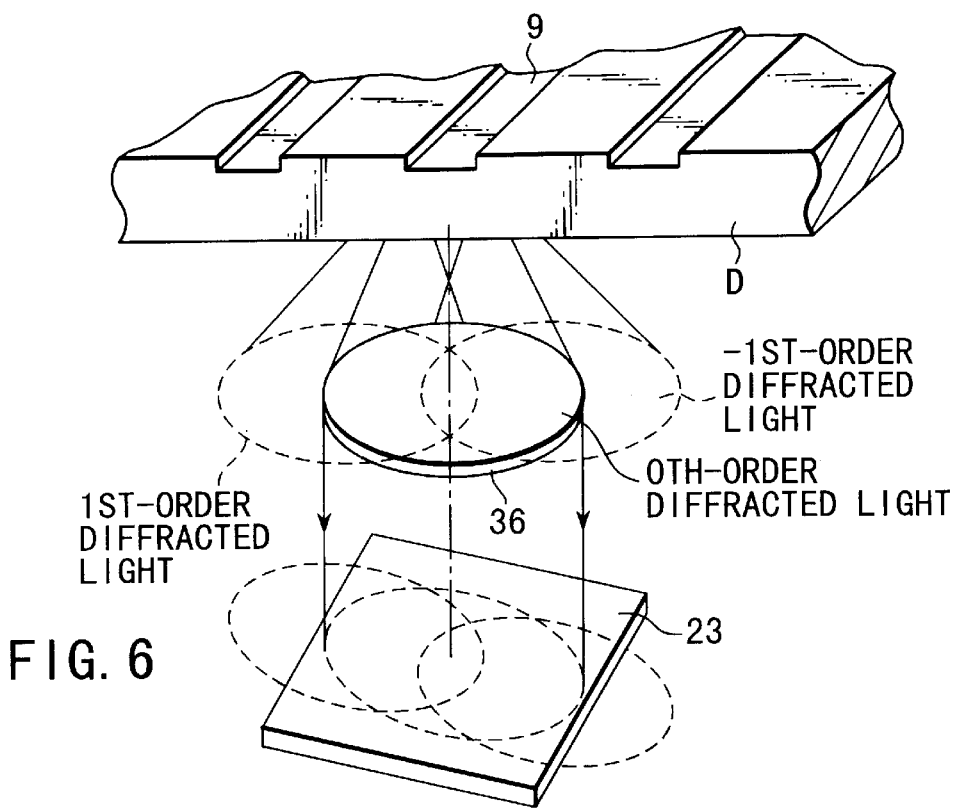
FIG. 6 is a schematic view for explaining the state of the laser beam reflected by the optical disk and returned to the objective lens of the actuator in FIGS. 3 and 5.

Assume that the 0th-order diffracted light, the 1st-order diffracted light, and the −1st-order diffracted light, which are described with reference to FIG. 6, are reflected (by the optical disk) and enter a photodetector 223 while the focused beam spot is tracing a pit array without de-tracking, as shown in FIG. 26. In this case, the incident positions of these light components on the photodetector 223 are shifted in accordance with the degree in which the intensity center of the 0th-order diffracted light is shifted from the division center of the photodetector due to the lens shift. At this time, the intensity center of the laser beam is positioned on the side where the laser beam occupies a larger area. Note that "the 0th-order diffracted light", "the 1st-order diffracted light", and "the −1st-order diffracted light" mean diffracted light components of the respective order that are produced in the radial direction by a sufficiently long pit. Although other diffracted light components are produced at the front and rear ends of the pit, a description thereof is omitted.

When, therefore, two sum signals are obtained by current-voltage-converting photoelectrically converted signals from detection regions 223α, 223γ, 223β, and 223δ of the photodetector 223 using the first to fourth current-voltage conversion circuits shown in FIG. 25, and adding the resultant signals using the first and second adders, the outputs corresponding to the first and second diagonal sum signals described with reference to FIG. 25 are dominated by the outputs from the detection regions 223γ and 223δ when the lens shift is presented.

When outputs from the respective detection regions of the photodetector undergo change by the influence of diffracted light from a pit in the optical disk D, the output change starts from the front half of the focused beam spot in the tracing direction (in this case, the detection regions 223α and 223δ correspond to the front side). According to the outputs Ib and Ic of the right half, the level of "1b" (output from the detection region 223δ) as the intensity of the diffracted light changes first due to the pit, and the level of "1c" (output from the detection region 223γ) changes next.

When, therefore, the known 4-split photodetector is used and the lens shift is presented, the relationship in phase between the two diagonal sum signals "1a+1c" and "1b+1d" at the time the focused beam spot passes through a pit is similar to the relationship in phase between the signals "1b" and "1c". As a consequence, a phase shift occurs, resulting in a track offset.

Figure 27:
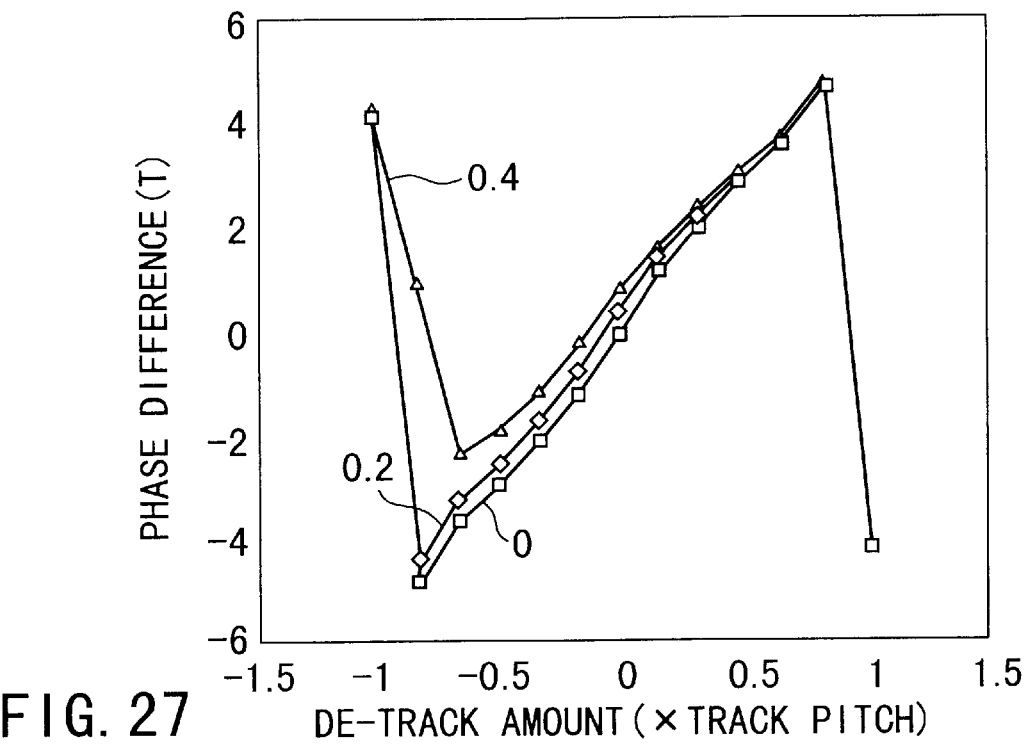
FIG. 27 is a graph showing examples of the phase difference signals obtained by using the known 2-split photodetector (not shown) assuming that the lens shift amount is 0.02 mm and 0.4 mm.
Figure 28:
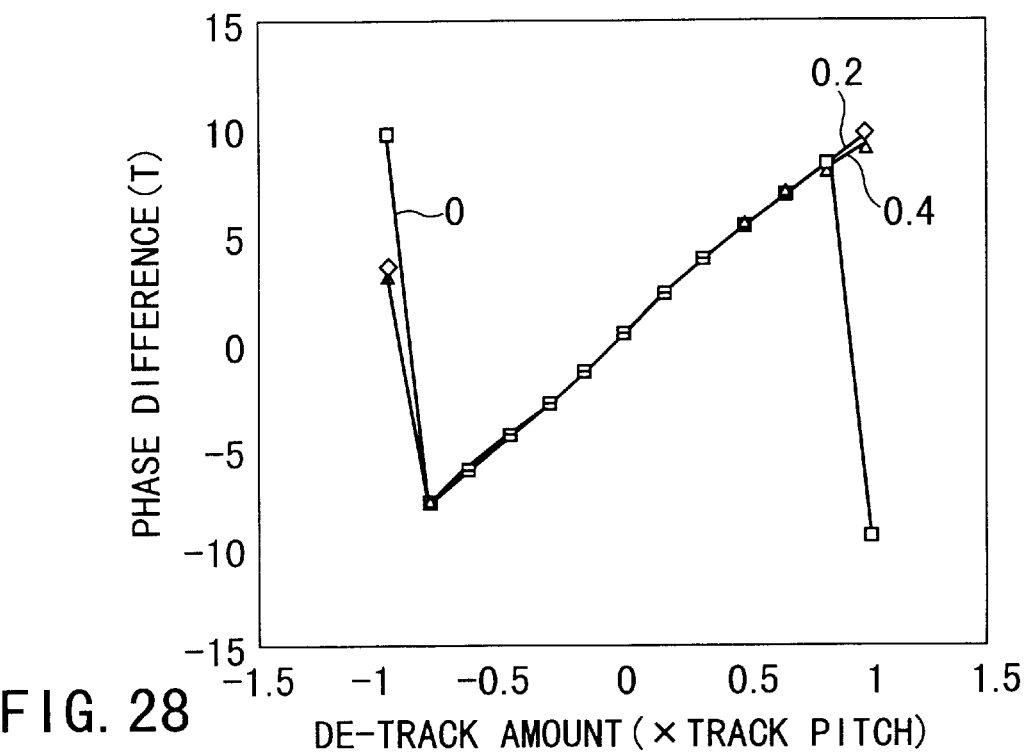
FIG. 28 is a graph showing examples of the phase difference signals obtained by using the 5-split photodetector of the present invention in FIG. 25 assuming that the lens shift amount is 0.02 mm and 0.4 mm.

FIG. 27 shows examples of calculations of phase difference signals in a case wherein the 4-split photodetector in FIG. 26 is used, and the lens shifts are 0.02 mm and 0.4 mm. FIG. 28 shows examples of calculations of phase difference signals in a case wherein the 5-split photodetector 123 in FIG. 23 is used, and the lens shifts are 0.02 mm and 0.4 mm. Referring to each of FIGS. 27 and 28, the abscissa represents the de-tracking amount measured in track pitches; and the ordinate, the level of a phase difference signal measured in channel bit times.

As is obvious from FIGS. 27 and 28, as shown in FIG. 23, when an output from the region where all 0th-order diffracted light, 1st-order diffracted light, and −1st-order diffracted light overlap each other is not used, the levels of the two diagonal sum signals obtained from the second to fifth detection regions 124a, 124b, 125a, and 125b are free from the influence of a lens shift, i.e., the magnitude of a track offset is reduced.

In the signal processing system shown in FIG. 25, a reproduction signal (Rf signal) can be easily obtained as the sum total of outputs from all the detection regions 123a, 124a, 124b, 125a, and 125b.

As a lens shift occurs, however, the intensity center of a collimated light beam supplied to the objective lens 36 shifts from the center of the aperture of the objective lens 36. This influences the intensity distribution of the focused beam spot. As a result, the intensity of diffracted light on the inner peripheral side of the pit in the radial direction differs from that on the outer peripheral side. For this reason, even if the 5-split photodetector 123 shown in FIG. 23 is used, the influence of a track offset cannot be completely eliminated.

A signal processing system that can be used for all signal processes including a process for a track offset by using a 5-split photodetector will be described below.

In consideration of the above factor that produces an offset component, which has been described above on the basis of the 5-split photodetector 123 in FIG. 23, in order to prevent a track offset from influencing the track deviation signal, it is important to make the photodetector receive 1st-order diffracted light and −1st-order diffracted light, mainly high-intensity light components, as much as possible, and also make the photodetector receive high-intensity light component of light components of 0th-order diffracted light as little as possible.

Figure 29:
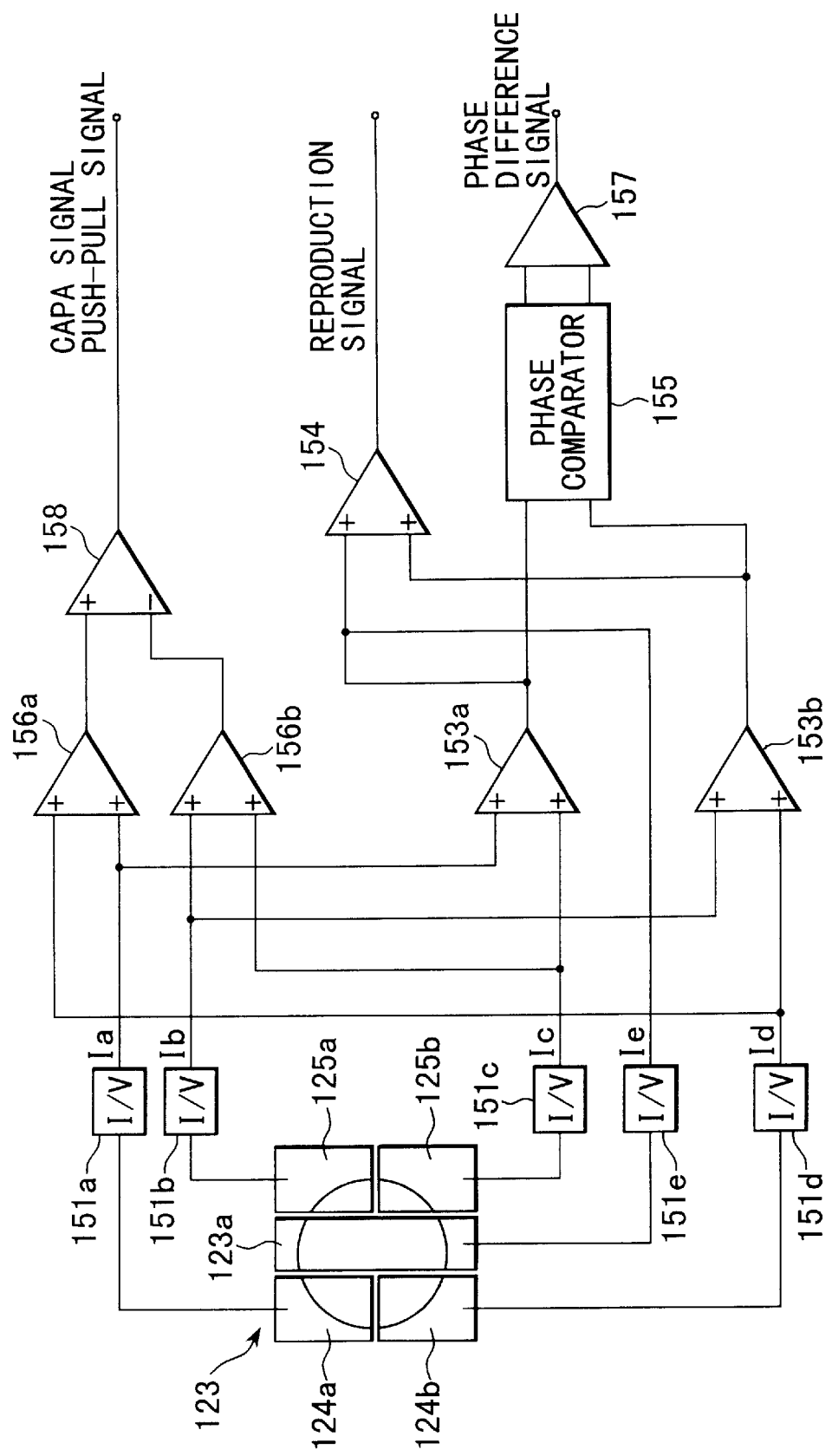
FIG. 29 is a block diagram showing another embodiment of the signal processing system in FIG. 25.

FIG. 29 is a schematic view showing a modification of the signal processing system in FIG. 25, and more specifically, an example of the signal processing system capable of generating a track deviation signal free from the influence of a track offset.

As shown in FIG. 29, photoelectrically converted signals from the second to fifth detection regions 124a, 124b, 125a, and 125b, and more specifically, the detection regions parallel to the groove shadow (not shown) contained in a reflected laser beam from the optical disk D, i.e., the detection regions 124a and 124b and the detection regions 125a and 125b, are current-voltage-converted by the first to fourth current-voltage conversion circuits 151a, 151b, 151c, and 151d, and the resultant signals are added by third and fourth adders 156a and 156b to obtain two sum signals ("1a+1d" and "1b+1c"; to be respectively referred to as first and second parallel sum signals hereinafter). In other words, the provision of the third and fourth adders 156a and 156b substantially amounts to handling the second and third detection regions 124a and 124b as one detection region, and the fourth and fifth detection regions 125a and 125b as one detection region.

An adder 158 obtains a push-pull signal by obtaining the difference between the outputs from the third and fourth addresses 156a and 156b. Note that the output from this adder 158 can also be used as an address signal on which a CAPA (Complementary Allocated Pit Address) signal, i.e., a header signal, is based.

By optimizing signal processing by the signal processing system using the 5-split photodetector 123 in FIG. 25 in this manner, an output signal like the one obtained by using the photodetector 23 as the first embodiment shown in FIG. 7, i.e., a tracking error signal with a track deviation signal whose central value is approximately "0" as indicated by the solid curve in FIG. 14, can be obtained.

Assuming the use of the 5-split photodetector shown in FIG. 25, letting $\Delta T$ be the average time of the phase difference between the first and second diagonal sum signals, and Two be the intervals between channel clocks from an optical disk apparatus to which the optical head apparatus shown in FIG. 1 is applied, when the center of a focused beam spot shifts from the center of a bit row by 0.1 μm in the radial direction, the minimum value of $\Delta T/Tw$ is 0.5.

In addition, letting T1 and T1 be the maximum positive value and maximum negative value of $\Delta T/Tw$, respectively, which changes as the center of the focused beam spot shifts from the center of the pit array, the maximum value of $|(T1-T2)/(T1+T2)|$ is 0.2.

Furthermore, assuming the use of the 5-split photodetector shown in FIG. 25, letting L1 and L2 be the levels of the output of each of the adder 156a and 156b, respectively, (L1−L2)pp be the amplitude of the difference signal between the levels L1 and L2, and (L1+L2)a be the level of the sum signal of the levels L1 and L2 when the focused beam spot is irradiated on that region of the recording surface of the optical disk D on which no information is recorded, i.e., a mirror portion, the first tracking auxiliary signal obtained by photoelectrically converting the laser beam incident on the first detection region and the second tracking auxiliary signal obtained by photoelectrically converting the light beam incident on the second light-receiving region satisfy $0.35 \leq (L1-L2)pp/(L1+L2)a \leq 1.05$.

In addition, letting [(L1−L2)/(L1+L2)]pp be the amplitude value obtained by dividing the instantaneous value of the signal represented by (L1−L2) by the instantaneous value of the signal level (L1+L2) regardless of whether information is written on the optical disk D, and the suffixes "min" and "max" respectively indicating the minimum and maximum values of the corresponding amplitudes, the first and second tracking auxiliary signals satisfy.

$1.10 \leq [(L1-L2)/(L1+L2)]pp \leq 1.65$, and $$\frac{[(L1-L2)/(L1+L2)]pp\min}{[(L1-L2)/(L1+L2)]pp\max} \geq 0.070.$$

In the land/groove recording method like the one schematically shown in FIG. 15, even with the use of the 5-split photodetector shown in FIG. 25, if, for example, the focused beam spot is located on a groove, the reproduction signals from the first and second header fields (to be referred to as ID1 and ID2, respectively) in FIG. 15 appear as, for example, waveforms having positive polarity, and the reproduction signals from the third and fourth header fields (to be referred to as ID3 and ID4, respectively) appear as waveforms having the negative polarity. Also, when the focused beam spot is located on a land, reproduction signals from ID1 and ID2 appear as waveforms having negative polarity, and the reproduction signals from ID3 and ID4 appear as waveform having positive polarity; the amplitudes of the header signals change as indicated by the curves A and B in FIG. 16. Note that the curve A indicates a case wherein the pit length is 0.64 μm; and the curve B, a case wherein the pit length is 0.83 μm.

As is obvious from FIG. 16, changes in relative amplitude are reduced to ½ or less those indicated by the curves a and b in spite of the fact that some lens shift is added to realize a high-speed seek.

For the same reason as that given by taking the 4-split photodetector 23 in FIG. 7 as an example with reference to FIG. 16, even in the presence of a lens shift, since an output from the detection region 123a where all 0th-order diffracted light, 1st-order diffracted light, and −1st-order diffracted light overlap is not used for detection of a track deviation, even if the intensity center of the 0th-order diffracted light of the reflected laser beam incident on the photodetector 123 is shifted by the lens shift, the header signal is virtually free from the influence of the lens shift as long as the shift amount falls within the range defined by the first detection region 123a. Note that the width of the first detection region 123a, i.e., the distance between the division lines 123b and 123c, is preferably set to approximately ⅓ the diameter of the focused beam spot provided by the 0th-order diffracted light, as described above.

Figure 30:
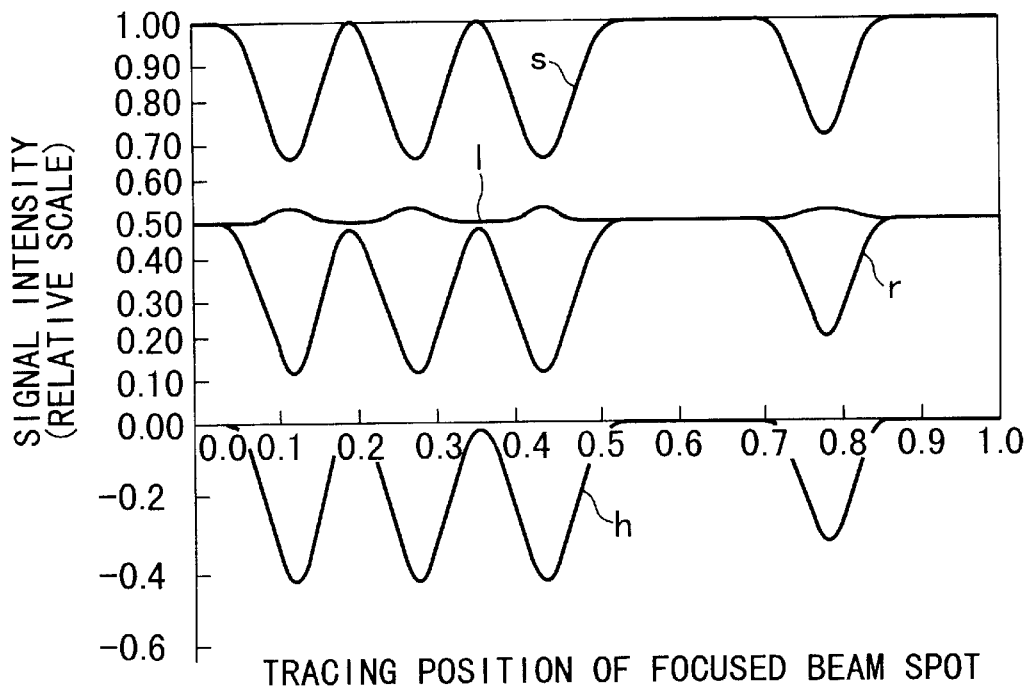
FIG. 30 is a graph showing the result obtained by calculating variations in header signal by using the known 4-split photodetector in FIG. 26 assuming that the lens shift amount is "0"
Figure 32:
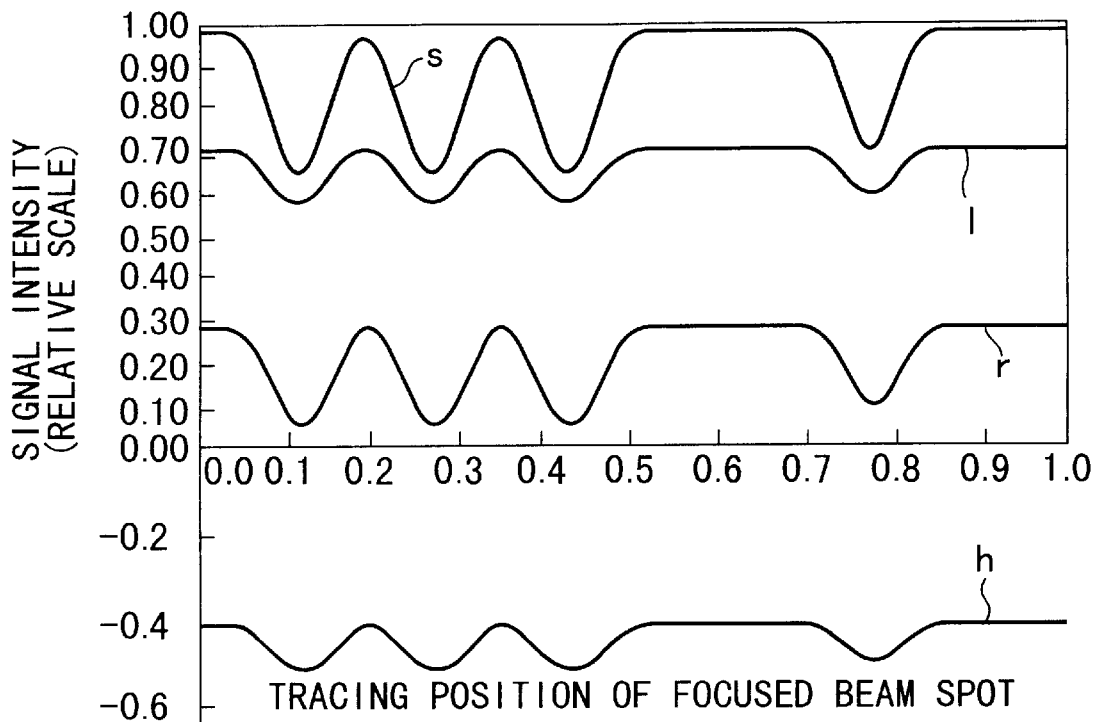
FIG. 32 is a graph showing the result obtained by calculating variations in header signal by using the known 4-split photodetector in FIG. 26 assuming that the lens shift is 10% the aperture ratio of the objective lens and is on the inner peripheral side of a groove.
Figure 34:
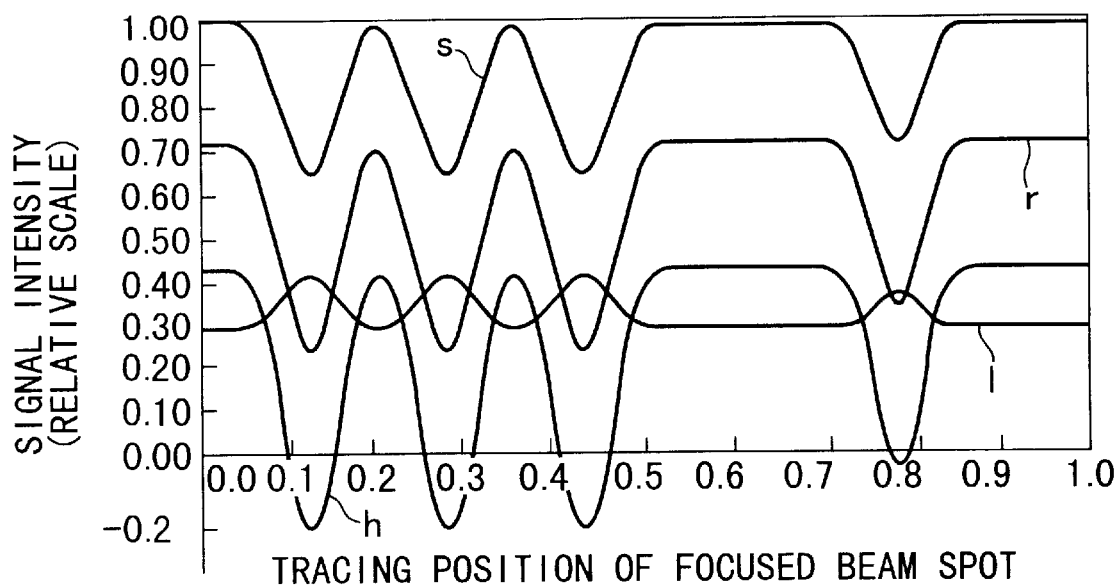
FIG. 34 is a graph showing the result obtained by calculating variations in header signal by using the known 4-split photodetector in FIG. 26 assuming that the lens shift is 10% the aperture ratio of the objective lens and is on the outer peripheral side of a groove.

FIG. 30 is a graph showing the result obtained by calculating variations in header signal by using the 4-split photodetector shown in FIG. 26 assuming that the lens shift amount is "0" so as to compare the 5-split photodetector in FIG. 25 with the conventional 4-split photodetector in FIG. 26. A curve h represents the output level of a header signal; a curve r, the sum of outputs from the detection regions δ and γ, i.e., the signal "1d+1c"; a curve l, the sum of outputs from the detection regions α and β, i.e., the signal "1a+1b"; and a curve s, the sum of the signal "1d+1c" and the signal "1a+1b", i.e., the sum total of the outputs from all the detection regions. Note that the abscissa represents the position of the focused beam spot in tracing several pits; and the ordinate, the level of the reproduction signal as a relative value. FIG. 32 is a graph showing the calculated values obtained by calculating the magnitudes of variations in header signal in a case wherein the conditions that the magnitude of the lens shift is 10% the aperture ratio of the objective lens, and the lens shift is on the inner peripheral side of a groove are added to the conditions shown in FIG. 30. FIG. 34 is a graph showing the calculated values obtained by calculating the magnitudes of variations in header signal in a case wherein the conditions that the magnitude of the lens shift is 10% the aperture ratio of the objective lens, and the lens shift is on the outer peripheral side of a groove are added to the conditions shown in FIG. 30.

Figure 31:
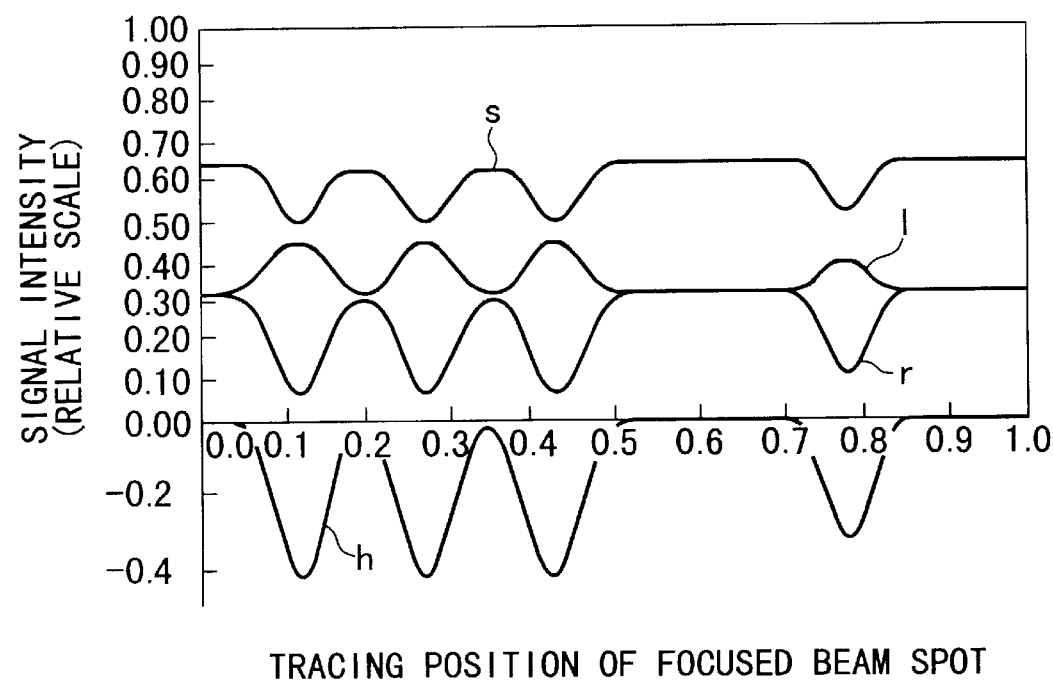
FIG. 31 is a graph showing the result obtained by calculating variations in header signal by using the 5-split photodetector of the present invention in FIG. 23 with a lens shift amount of "0"

FIG. 31 is a graph showing the result obtained by calculating variations in header signal by using the 5-split photodetector in FIG. 25 under the conditions described with reference to FIG. 30. Note that the conditions represented by the respective curves are denoted by the same reference symbols as those in FIG. 30.

Figure 33:
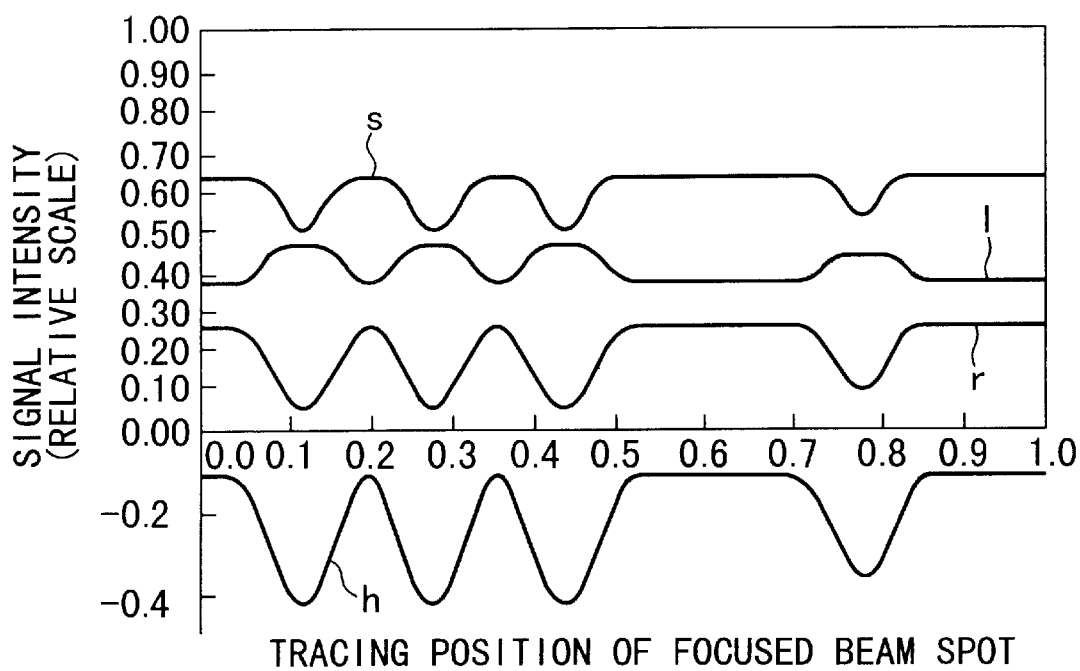
FIG. 33 is a graph showing the result obtained by calculating variations in header signal by using the 5-split photodetector of the present invention in FIG. 23 assuming that the lens shift is 10% the aperture ratio of the objective lens and is on the inner peripheral side of a groove.

FIG. 33 is a graph showing the result obtained by calculating variations in header signal in a case wherein the conditions that the magnitude of the lens shift is 10% the aperture ratio of the objective lens, and the lens shift is on the inner peripheral side of a groove are added to the conditions shown in FIG. 31. Note that the conditions represented by the respective curves are denoted by the same reference symbols as those in FIG. 30.

Figure 35:
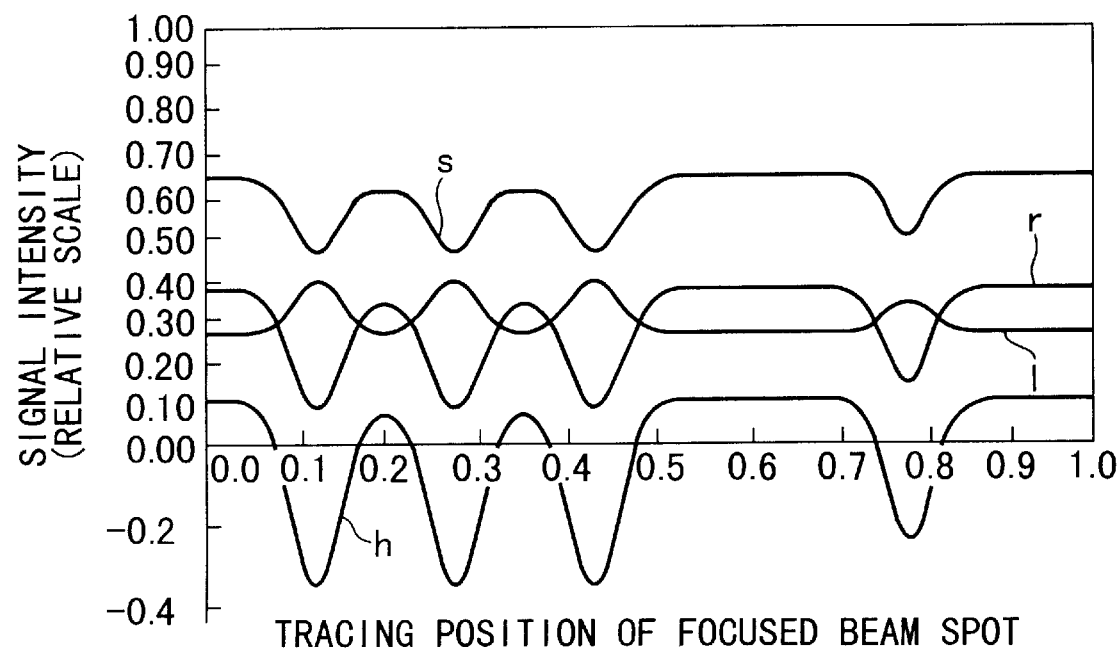
FIG. 35 is a graph showing the result obtained by calculating variations in header signal by using the 5-split photodetector of the present invention in FIG. 23 assuming that the lens shift is 10% the aperture ratio of the objective lens and is on the outer peripheral side of a groove.

FIG. 35 is a graph showing the result obtained by calculating variations in header signal in a case wherein the conditions that the magnitude of the lens shift is 10% the aperture ratio of the objective lens, and the lens shift is on the outer peripheral side of a groove are added to the conditions shown in FIG. 31. Note that the conditions represented by the respective curves are denoted by the same reference symbols as those in FIG. 30.

As is obvious from FIGS. 31, 33, and 35, a header signal that does not vary much and requires no special correction can be obtained by removing the signal output from the region substantially corresponding to the center of a reflected light beam in a direction parallel to a groove, i.e., the region where all 0th-order diffracted light, 1st-order diffracted light, and −1st-order diffracted light overlap each other, from the tracking error signal.

In the state wherein a total of four header fields, i.e., the first, second, third, and fourth header fields, are unevenly distributed in pairs in the inner and outer peripheral directions of the optical disk with respect to the center of a groove, as shown in FIG. 15, letting $L_{VFO}$ be the signal amplitude at the VFO portion (i.e., the continuous, repetitive data pattern portion used to ensure reliable data reproduction against variations in the rotation of the optical disk) of the pre-pits in a header field, $L_O$ be the signal level at that mirror portion, of the recording surface of the optical disk, on which no information is recorded, and $L_{hmax}$ be the maximum value of the signal amplitudes at the header field, the calculation results shown in FIGS. 31, 33, and 35 satisfy $L_{VFO}/L_O \geq 0.25$, and $L_{VFO}/L_{hmax} \geq 0.50$.

In addition, letting $L_{AMHD1}$ be the maximum value of signal amplitudes from the first header field, $L_{AMHD2}$ be the maximum value of signal amplitudes from the second header field, $L_{AMHD3}$ be the maximum value of signal amplitudes from the third header field, and $L_{AMHD4}$ be the maximum value of signal amplitudes from the fourth header field, the calculation results satisfy $0.9 \leq L_{AMHD2}/L_{AMHD1} \leq 1.1$, $0.9 \leq L_{AMHD4}/L_{AMHD3} \leq 1.1$, $0.8 \leq L_{AM13}/L_{AMHD1}$, and $0.8 \leq L_{AM31}/L_{AMHD3}$.

Furthermore, letting $L\alpha_{HD1}$ be the level of the difference between the upper limit value of the signals from the VFO portion (not shown) in the signals from the first header field, and the upper limit value of all the header signals when the focused beam spot is located on a groove, and the level of the difference between the lower limit value of the signals from the VFO portion (not shown) in the signals from the first header field and the lower limit value of all the header signals when the focused beam spot is located on a land, $L\alpha_{HD2}$ be the level of the difference between the upper limit value of the signals from the VFO portion (not shown) in the signals from the second header field, and the upper limit value of all the header signals when the focused beam spot is located on a groove, and the level of the difference between the lower limit value of the signals from the VFO portion (not shown) in the signals from the second header field and the lower limit value of all the header signals when the focused beam spot is located on a land, $L\alpha_{HD3}$ be the level of the difference between the upper limit value of the signals from the VFO portion (not shown) in the signals from the third header field, and the upper limit value of all the header signals when the focused beam spot is located on a groove, and the level of the difference between the lower limit value of the signals from the VFO portion (not shown) in the signals from the third header field and the lower limit value of all the header signals when the focused beam spot is located on a land, $L\alpha_{HD4}$ be the level of the difference between the upper limit value of the signals from the VFO portion (not shown) in the signals from the fourth header field, and the upper limit value of all the header signals when the focused beam spot is located on a groove, and the level of the difference between the lower limit value of the signals from the VFO portion (not shown) in the signals from the fourth header field and the lower limit value of all the header signals when the focused beam spot is located on a land, $L\beta_{HD1}$ be the level of the difference between the lower limit value of the signals from the VFO portion (not shown) in the signals from the first header field, and the lower limit value of all the header signals when the focused beam spot is located on a groove, and the level of the difference between the upper limit value of the signals from the VFO portion (not shown) in the signals from the first header field and the upper limit value of all the header signals when the focused beam spot is located on a land, $L\beta_{HD2}$ be the level of the difference between the lower limit value of the signals from the VFO portion (not shown) in the signals from the second header field, and the lower limit value of all the header signals when the focused beam spot is located on a groove, and the level of the difference between the upper limit value of the signals from the VFO portion (not shown) in the signals from the second header fi and the upper limit value of all the header signals when the focused beam spot is located on a land, $L\beta_{HD3}$ be the level of the difference between the lower limit value of the signals from the VFO portion (not shown) in the signals from the third header field, and the lower limit value of all the header signals when the focused beam spot is located on a groove, and the level of the difference between the upper limit value of the signals from the VFO portion (not shown) in the signals from the third header field and the upper limit value of all the header signals when the focused beam spot is located on a land, and $L\beta_{HD4}$ be the level of the difference between the lower limit value of the signals from the VFO portion (not shown) in the signals from the fourth header field, and the lower limit value of all the header signals when the focused beam spot is located on a groove, and the level of the difference between the upper limit value of the signals from the VFO portion (not shown) in the signals from the fourth header field and the upper limit value of all the header signals when the focused beam spot is located on a land, the calculation results satisfy $-0.1 \leq L\beta_{HD1}/L\alpha_{HD1}/2L_{AMHD1} \leq 1.1$, $-0.1 \leq L\beta_{HD2}/L\alpha_{HD2}/2L_{AMHD1} \leq 1.1$, $-0.1 \leq L\beta_{HD3}/L\alpha_{HD3}/2L_{AMHD1} \leq 0.1$, and $-0.1 \leq L\beta_{HD4}/L\alpha_{HD4}/2L_{AMHD1} \leq 0.1$.

In addition, letting $L_{HD1}$ be the lower limit level of the amplitude of the signal obtained by photoelectrically converting the light beam reflected by the first header field and launched into the photodetector, $L_{HD2}$ be the lower limit level of the amplitude of the signal obtained by photoelectrically converting the light beam reflected by the second header field and launched into the photodetector, $L_{HD3}$ be the lower limit level of the amplitude of the signal obtained by photoelectrically converting the light beam reflected by the third header field and launched into the photodetector, and $L_{HD4}$ be the lower limit level of the amplitude of the signal obtained by photoelectrically converting the light beam reflected by the fourth header field and launched into the photodetector, the calculation results satisfy $|[(L_{HD1}+L_{HD2})-(L_{HD3}+L_{HD4})]/2L_0| \leq 0.05$.

Moreover, when the focused beam spot is offset from the center of the groove by 0.1 μm in the radial direction of the information recording medium, the calculation results satisfy $0.15 \leq |[(L_{HD1}+L_{HD2})-(L_{HD3}+L_{HD4})]/2L_0|$.

As has been described above, according to the optical head apparatus of the present invention, portions of the light-receiving region of a photodetector for detecting a tracking error signal are used as light-receiving regions for detecting an offset component so as to remove the offset component output from the tracking error signal. With this arrangement, the offset component contained in the tracking error signal, i.e., the influence of a lens shift on the tracking error signal, can be eliminated by using light from the regions where the 0th-order diffracted light, 1st-order diffracted light, and −1st-order diffracted light of the light reflected by the optical disk overlap each other. This realizes stable tracking control.

According to the optical head apparatus of the present invention, outputs from the linear light-receiving regions for detecting an offset component and the light-receiving regions for detecting a track deviation are set to appropriate magnitudes by the gain controller. Therefore, an inexpensive photodetector capable of detecting an offset component can be provided, and detection of an offset component and variation in magnitude due to an output from the photodetector can be prevented.

In addition, according to the optical head apparatus of the present invention, intrinsic differential components that may be produced owing to the difference between the areas of the two light-receiving regions used to detect an offset component, the precision of the components of the optical head apparatus, or assembly of the optical head apparatus are set to appropriate magnitudes by the gain controller. This therefore prevents increases in assembly cost and parts cost for the detection of an offset component.

This apparatus uses the photodetector having the four detection regions arranged to receive no reflected laser beam from the region where all 0th-order diffracted light, 1st-order diffracted light, and −1st-order diffracted light overlap each other, and the fifth detection region placed in the middle of the four detection regions to receive the reflected laser beam from the region where all the 0th-order diffracted light, 1st-order diffracted light, and −1st-order diffracted light overlap each other. The apparatus generates a track deviation signal from outputs from the four detection regions. This can prevent an offset component from being superimposed on the track deviation signal.

In addition, there is provided an optical head apparatus that produces no track offset because the difference between the diagonal sum signals of the signals output from the four detection regions is used to detect any phase difference.

Furthermore, since the difference between the parallel sum signals of the signals output from the four detection regions is used to detect a track deviation, a track deviation signal free from the influence of an offset component can be obtained even if some lens shift is added.

Moreover, header information can be read from an optical disk based on the land/groove recording method by devising a method of reading a header signal.

According to the present invention, a header signal from unevenly distributed pre-pits and a reproduction signals can be properly detected. This allows extraction of signals for recording/reproducing information on/from, for example, a DVD-RAM disk.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical head apparatus comprising:

a light source for emitting a light beam having a predetermined wavelength;

an objective lens for focusing the light beam emitted from said light source to provide a minimum beam spot at a predetermined position on a recording surface of a recording medium at a predetermined depth, and condensing (capturing) a reflected light beam reflected by the recording surface of the recording medium;

a photodetector including at least three light-receiving regions defined by first and second division lines extending in a direction perpendicular to a direction in which a beam spot of the reflected light beam moves as the beam spot of the light beam focused on the recording surface by said objective lens moves in a radial direction of the recording medium, and serving to output a current corresponding to an intensity of the reflected light beam, the first light-receiving region of said photodetector having a size that covers a region where a central beam spot reflected by the recording surface of the recording medium and having a highest intensity and two peripheral beam spots generated by diffraction on the recording surface at predetermined intervals with respect to the central beam spot in the direction in which the beam spot of the reflected light beam moves overlap each other, and serving to remove an unwanted signal component, the second light-receiving region of said photodetector having a size that covers a region where the central beam spot and one of the peripheral beam spots overlap each other but not including the first light receiving region, and serving to generate a first header auxiliary signal, and the third light-receiving region of said photodetector having a size that covers a region where the central beam spot and the other of the peripheral beam spots overlap each other but not including the first light receiving region, and serving to generate a second header auxiliary signal.

2. An apparatus according to claim 1, wherein the first light-receiving region of said photodetector is substantially equidistant from the two peripheral beam spots, and is further divided into two belt-like light-receiving regions by a third division line parallel to the first and second division lines.

3. An apparatus according to claim 2, wherein outputs from the two belt-like light-receiving regions are used to remove offset components contained in the first and second header auxiliary signals.

4. An apparatus according to claim 2, wherein outputs from the two belt-like light-receiving regions are used to remove offset components contained in the first and second header auxiliary signals from a header signal obtained by adding the first and second header auxiliary signals.

5. An apparatus according to claim 1, wherein each of the second and third light-receiving regions of said photodetector is further divided into two light-receiving regions by fourth and fifth division lines perpendicular to the first and second division lines.

6. An apparatus according to claim 5, wherein a difference between a sum of an output from one of the light-receiving regions of the second light-receiving regions, defined by the fourth division line, and an output from one of the light-receiving regions of the third light-receiving region, defined by the fifth division line, which region is at a rotation-symmetrical (diagonal) position with respect to the one of the light-receiving regions of the second light-receiving region, and a sum of an output from the other of the light-receiving regions of the second light-receiving region, defined by the fourth division line, and an output from the other of the light-receiving regions of the third light-receiving region, defined by the fifth division line, which region is at a rotation-symmetrical (diagonal) position with respect to the other of the light-receiving regions of the second light-receiving region, can be used to control a reference position of said objective lens for moving the beam spot of the light beam in the radial direction of the recording medium.

7. An apparatus according to claim 5, wherein a difference between a sum of an output from one of the light-receiving regions of the second light-receiving region, defined by the fourth division line, and an output from one of the light-receiving regions of the third light-receiving region, defined by the fifth division line, which region is at a rotation-symmetrical (diagonal) position with respect to the one of the light-receiving regions of the second light-receiving region, and a sum of an output from the other of the light-receiving regions of the second light-receiving region, defined by the fourth division line, and an output from the other of the light-receiving regions of the third light-receiving region, defined by the fifth division line, which region is at a rotation-symmetrical (diagonal) position with respect to the other of the light-receiving regions of the second light-receiving region, can be used for tracking control on said objective lens with respect to a guide groove (groove) or a pit array formed in the recording surface of the recording medium.

8. An optical head apparatus according to claim 1, wherein the first division line extends along a direction tangent to a direction in which a guide groove (groove) or a pit array is formed in the recording medium.

9. An optical head apparatus comprising:

a light source for emitting a light beam;

a polarization beam splitter for guiding the light beam emitted from said light source to a recording medium;

an objective lens for focusing the light beam passing through said polarization beam splitter onto a recording surface of the recording medium while giving the light beam predetermined imaging characteristics;

a tracking control coil for generating thrust for moving said objective lens in a direction perpendicular to a guide groove unique to the recording medium;

a non-polarization beam splitter serving as a half mirror for splitting a light beam split from the light beam focused on the recording surface of the recording medium by said objective lens, reflected by the recording surface, passing through said objective lens, reflected by said polarization beam splitter, and traveling toward said objective lens into two light beams having substantially the same intensity;

a photodetector having first and second light-receiving regions defined by a division line extending along a direction in which a shadow of the guide groove unique to the recording medium or a pit array and first and second linear light-receiving regions defined in the first and second light-receiving region by linear outline division lines defined symmetrically with respect to the division line as an axis of symmetry, serving to receive light beams split by said non-polarization beam splitter through the first and second light-receiving regions, photoelectrically convert the light beams, and generate a tracking error signal indicating the amount of deviation between a center of the guide groove unique to the recording medium and a center of the light beam focused by said objective lens, and serving to receive, through the first and second linear light-receiving regions, a light beam irradiated on a region where 0th-order diffracted light, 1st-order diffracted light, and −1st-order diffracted light of the light beam reflected by the recording surface of the recording medium overlap each other, photoelectrically convert the received light beam, and generate a signal corresponding to an offset component in the tracking error signal indicating the amount of deviation between the center of the guide groove unique to the recording medium and the center of the light beam focused by said objective lens;

a track deviation/offset detection circuit for obtaining an actual amount of deviation between the center of the guide groove unique to the recording medium and the center of the light beam focused by said objective lens by subtracting a difference signal between output signals output from the first and second linear light-receiving regions from a difference signal between two signals obtained by adding predetermined combinations of outputs from the first and second light-receiving regions of said photodetector and outputs from the first and second linear light-receiving regions; and a tracking control circuit for supplying a current to said tracking control coil in a predetermined direction on the basis of a track deviation signal obtained by said track deviation/offset detection circuit.

10. An optical head apparatus comprising:

a light source for emitting a light beam;

a polarization beam splitter for guiding the light beam emitted from said light source to a recording medium;

an objective lens for focusing the light beam passing through said polarization beam splitter onto a recording surface of the recording medium while giving the light beam predetermined imaging characteristics;

a tracking control coil for generating thrust for moving said objective lens in a direction perpendicular to a guide groove unique to the recording medium;

a non-polarization beam splitter serving as a half mirror for splitting a light beam split from the light beam focused on the recording surface of the recording medium by said objective lens, reflected by the recording surface, passing through said objective lens, reflected by said polarization beam splitter, and traveling toward said objective lens into two light beams having substantially the same intensity;

a photodetector having a total of five light-receiving regions including first and second light-receiving regions defined by first and second division lines extending in a direction in which a shadow of the guide groove unique to the recording medium is projected or a pit array, a middle light-receiving region sandwiched between the first and second light-receiving regions, and light-receiving regions obtained by dividing the first and second light-receiving regions by using fourth and fifth division lines perpendicular to the first and second division lines, and capable of receiving and photoelectrically converting light beams split by said non-polarization beam splitter through the first and second light-receiving regions and outputting a difference between a sum of an output from one of the light-receiving regions of the second light-receiving region, defined by the fourth division line, and an output from one of the light-receiving regions of the third light-receiving region, defined by the fifth division line, which region is at a rotation-symmetrical (diagonal) position with respect to the one of the light-receiving regions of the second light-receiving region, and a sum of an output from the other of the light-receiving regions of the second light-receiving region, defined by the fourth division line, and an output from the other of the light-receiving regions of the third light-receiving region, defined by the fifth division line, which region is at a rotation-symmetrical (diagonal) position with respect to the other of the light-receiving regions of the second light-receiving region;

a track deviation detection circuit for obtaining a tracking error signal indicating an amount of deviation between the center of the guide groove unique to the recording medium and the center of the light beam converged by said objective lens on the basis of the different between the two (diagonal) outputs which is output from said photodetector; and a tracking control circuit for supplying a current to said tracking control coil in a predetermined direction on the basis of a track deviation signal obtained by said track deviation detection circuit.

* * * * *